United States Patent
Ohno

(10) Patent No.: US 10,311,260 B2
(45) Date of Patent: Jun. 4, 2019

(54) DISPLAY APPARATUS, IMAGE DISPLAY SYSTEM, AND INFORMATION PROVIDING SERVER

(71) Applicant: Sharp Kabushiki Kaisha, Osaka (JP)

(72) Inventor: Michihiro Ohno, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/522,126

(22) PCT Filed: Oct. 22, 2015

(86) PCT No.: PCT/JP2015/079795
§ 371 (c)(1),
(2) Date: Apr. 26, 2017

(87) PCT Pub. No.: WO2016/068006
PCT Pub. Date: May 6, 2016

(65) Prior Publication Data
US 2017/0337403 A1    Nov. 23, 2017

(30) Foreign Application Priority Data

Oct. 29, 2014 (JP) .................................. 2014-220850

(51) Int. Cl.
*G06K 7/10* (2006.01)
*G09G 5/00* (2006.01)
(Continued)

(52) U.S. Cl.
CPC .......... *G06K 7/10297* (2013.01); *G06F 3/147* (2013.01); *G06K 7/10316* (2013.01); *G06K 7/10386* (2013.01); *G09G 5/00* (2013.01); *G09G 5/006* (2013.01); *G09G 5/38* (2013.01); *H04B 5/0025* (2013.01); *H04B 5/0056* (2013.01);
(Continued)

(58) Field of Classification Search
None
See application file for complete search history.

(56) References Cited

U.S. PATENT DOCUMENTS 5,587,558 A * 12/1996 Matsushima ......... G06F 3/0346
                                                         178/18.01
2010/0081378 A1    4/2010 Kawamura
(Continued)

FOREIGN PATENT DOCUMENTS

JP    2008-148148 A    6/2008
JP    2008-165651 A    7/2008
(Continued)

*Primary Examiner* — Zhiyu Lu
(74) *Attorney, Agent, or Firm* — ScienBiziP, P.C.

(57) ABSTRACT

The present disclosure facilitates the establishment of near field communication with a mobile terminal while also preventing malfunctions and an increase in burden of maintenance. A display apparatus (10) includes: at least one antenna (140) for carrying out near field communication with a mobile terminal (20), the at least one antenna being provided so as to positionally overlap with a display section (160). In a case where the mobile terminal comes into proximity to the display section, the display section is caused to display a guide for bringing the mobile terminal in proximity to at least one of the at least one antenna.

5 Claims, 20 Drawing Sheets

(51) Int. Cl.
*G09G 5/38* (2006.01)
*H04B 5/00* (2006.01)
*G06F 3/147* (2006.01)
*G09F 19/00* (2006.01)

(52) U.S. Cl.
CPC ..... *G09F 19/00* (2013.01); *G09G 2340/0464* (2013.01); *G09G 2354/00* (2013.01); *G09G 2356/00* (2013.01); *G09G 2370/16* (2013.01)

(56) References Cited

U.S. PATENT DOCUMENTS

| | | | |
|---|---|---|---|
| 2010/0282835 A1 | 11/2010 | Wakamoto et al. | |
| 2013/0084801 A1* | 4/2013 | Royston | G06K 7/015 455/41.1 |
| 2013/0109310 A1* | 5/2013 | Mine | G06F 3/0488 455/41.1 |
| 2013/0141567 A1* | 6/2013 | Walker | H04M 1/7253 348/135 |
| 2013/0281014 A1* | 10/2013 | Frankland | H04W 4/008 455/41.1 |

FOREIGN PATENT DOCUMENTS

| | | |
|---|---|---|
| JP | 2010-96734 A | 4/2010 |
| JP | 5086356 B2 | 11/2012 |

\* cited by examiner

DISPLAY APPARATUS, IMAGE DISPLAY SYSTEM, AND INFORMATION PROVIDING SERVER

TECHNICAL FIELD

The present invention relates to (i) a display apparatus capable of communicating with a mobile terminal, (ii) an image display system including the display apparatus and a server, (iii) an information providing server which connects to the display apparatus.

BACKGROUND ART

Recent years have witnessed developments in technology for sending and receiving information via Near Field Communication (NFC). In NFC, devices having an antenna for sending/receiving information are positioned such that their respective antennas are in proximity to each other. This establishes communication and enables sending/receiving of information.

Patent Literature 1 discloses one example of technology utilizing near field communication, specifically, an advertisement panel including an RFID (Radio Frequency Identification) reader/writer. Patent Literature 2 discloses another example, specifically, an object position management system in which it is possible to use UHF-band RFID to detect a position of an object.

CITATION LIST

Patent Literature

[Patent Literature 1]
  Specification of Japanese Patent No. 5086356 (Sep. 14, 2012)
[Patent Literature 2]
  Japanese Patent Application Publication, Tokukai, No. 2010-96734 (Publication date: Apr. 30, 2010)

SUMMARY OF INVENTION

Technical Problem

Patent Literature 1 discloses a configuration in which an antenna of the reader/writer is provided on a back side of the advertisement panel and is moved to a position corresponding to a mark printed on the advertisement panel. This makes it possible to establish near field communication by holding a mobile information terminal near the mark.

Note that recent years have also witnessed the popularization of display apparatuses used as digital signage for displaying advertisements and notices in stations, at storefronts, inside stores, and at other such locations. Employing near field communication functionality has been proposed for such display apparatuses as well. While the disclosures of Patent Literature 1 could potentially be employed for this purpose, doing so would involve the use of a mechanism for moving a reader/writer. This would cause the problem of malfunctions and an increase in the burden of maintenance.

The present invention has been made in view of the above problem. An object of the present invention lies in providing, for example, a display apparatus which facilitates the establishment of near field communication with a mobile terminal while also preventing malfunctions and an increase in the burden of maintenance.

Solution to Problem

In order to solve the above problem, a display apparatus in accordance with one aspect of the present invention is a display apparatus capable of communicating with a mobile terminal, including: at least one antenna for carrying out near field communication with the mobile terminal, the at least one antenna being provided so as to positionally overlap with a display section of the display apparatus; and a display control section configured to output an image and cause the display section to display the image, the display control section causing, in a case where the mobile terminal has come into proximity to the display section, the display section to display a guide for bringing the mobile terminal into proximity to at least one of the at least one antenna.

In order to solve the above problem, an image display system in accordance with one aspect of the present invention includes: a display apparatus which includes at least one antenna for carrying out near field communication with a mobile terminal, the at least one antenna being provided so as to positionally overlap with a display section of the display apparatus; and a server which includes a display position information outputting section, the display position information outputting section being configured to provide, to the display apparatus, display position information which indicates a display position of a guide, the guide being for bringing the mobile terminal into proximity to at least one of the at least one antenna.

In order to solve the above problem, an information providing server in accordance with one aspect of the present invention is an information providing server, which connects to a display apparatus capable of communicating with a mobile terminal, the information providing server including; a display position information outputting section configured to provide, to the display apparatus, display position information which indicates a display position of a guide, the guide being for bringing the mobile terminal into proximity to at least one antenna of the display apparatus, the at least one antenna being (i) for carrying out near field communication with the mobile terminal and (ii) provided so as to positionally overlap with a display section of the display apparatus.

In order to solve the above problem, an information providing method in accordance with one aspect of the present invention is an information providing method for providing information to a display apparatus capable of communicating with a mobile terminal, the method including the step of: providing, to the display apparatus, display position information which indicates a display position of a guide, the guide being for bringing the mobile terminal into proximity to at least one antenna of the display apparatus, the at least one antenna being (i) for carrying out near field communication with the mobile terminal and (ii) provided so as to positionally overlap with a display section of the display apparatus.

Advantageous Effects of Invention

An aspect of the present invention makes it possible to facilitate the establishment of near field communication with a mobile terminal while also preventing malfunctions and an increase in the burden of maintenance.

BRIEF DESCRIPTION OF DRAWINGS (a) of FIG. 1 is a functional block diagram illustrating main components of a display apparatus in accordance with Embodiment 1 of the present invention, (b) of FIG. 1 is a block diagram illustrating a hardware configuration of the display apparatus in accordance with Embodiment 1 of the present invention.

(a) of FIG. 2 is a functional block diagram illustrating main components of a mobile terminal in Embodiment 1 of the present invention, (b) of FIG. 2 is a block diagram illustrating a hardware configuration of the mobile terminal in Embodiment 1 of the present invention.

Figure 7:
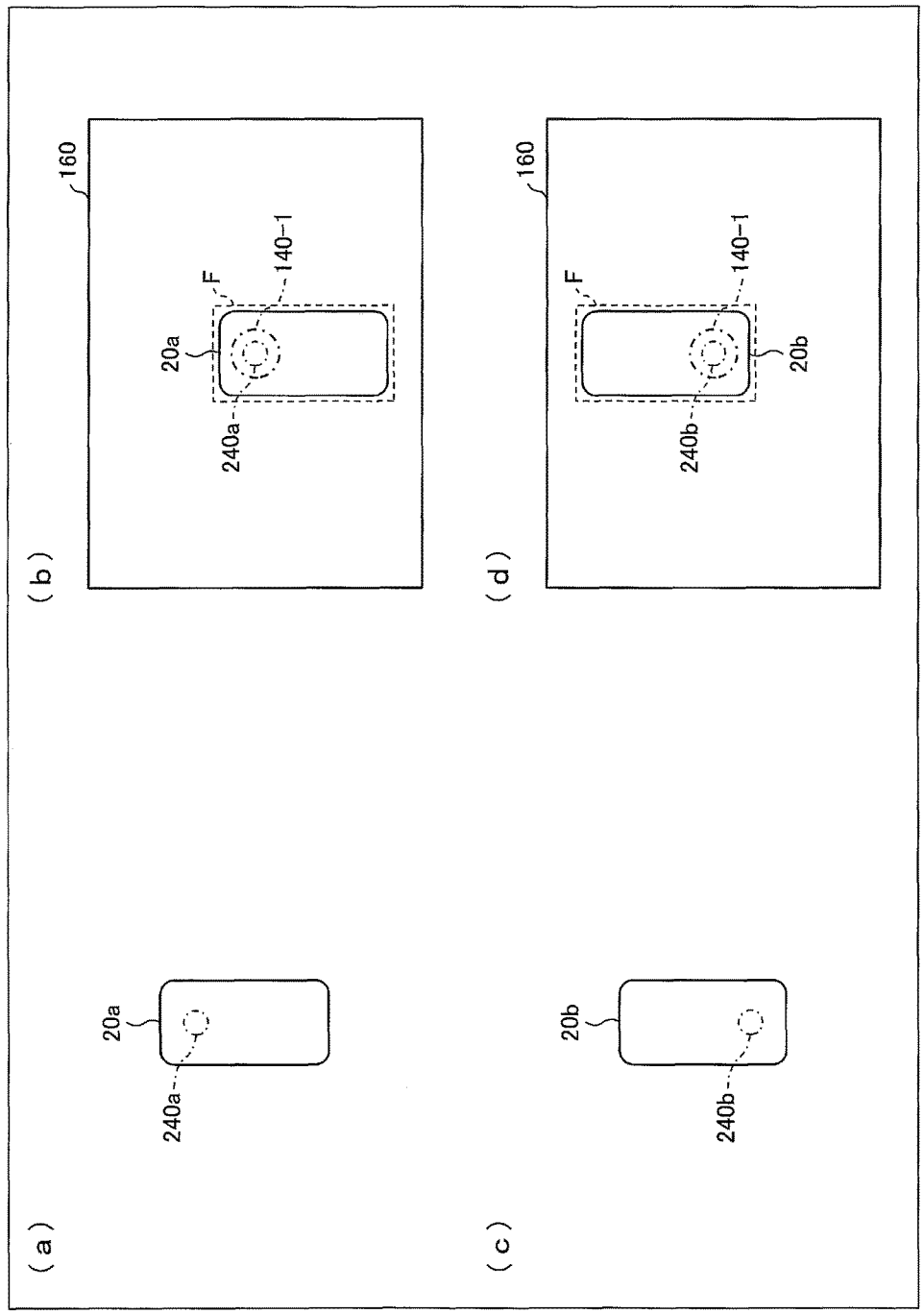

(a) of FIG. 7 is a diagram illustrating an example of a mobile terminal in Embodiment 1 of the present invention, (b) of FIG. 7 is a diagram illustrating an example of a guide which is displayed in order to bring the mobile terminal of (a) of FIG. 7 into proximity with the display apparatus, (c) of FIG. 7 is a diagram illustrating another example of a mobile terminal in Embodiment 1 of the present invention, (d) of FIG. 7 is a diagram illustrating an example of a guide which is displayed in order to bring the mobile terminal of (d) of FIG. 7 into proximity with the display apparatus.

Figure 8:
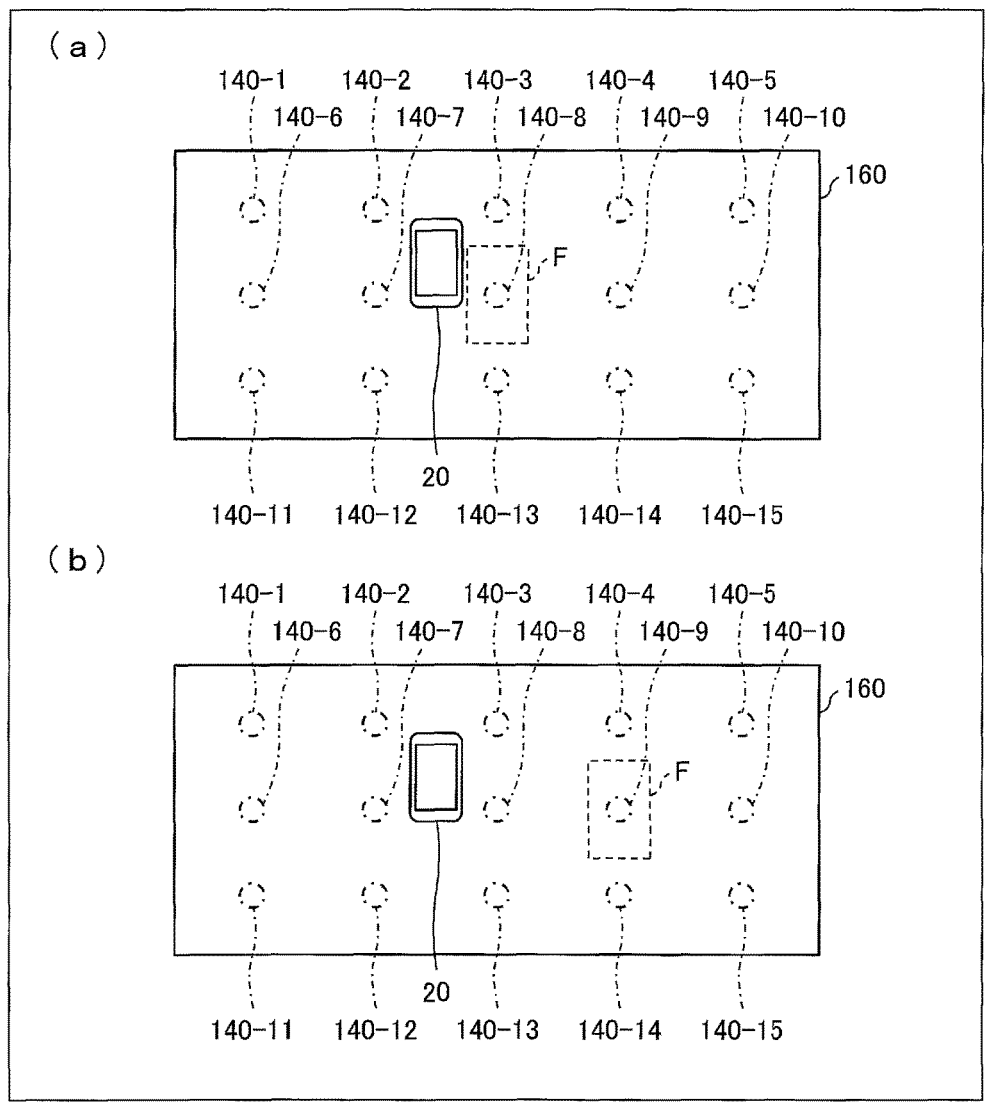

(a) of FIG. 8 is a diagram illustrating an example of a display screen of the display apparatus in accordance with Embodiment 1 of the present invention, (b) of FIG. 8 is a diagram illustrating another example of a display screen of the display apparatus in accordance with Embodiment 1 of the present invention.

Figure 9:
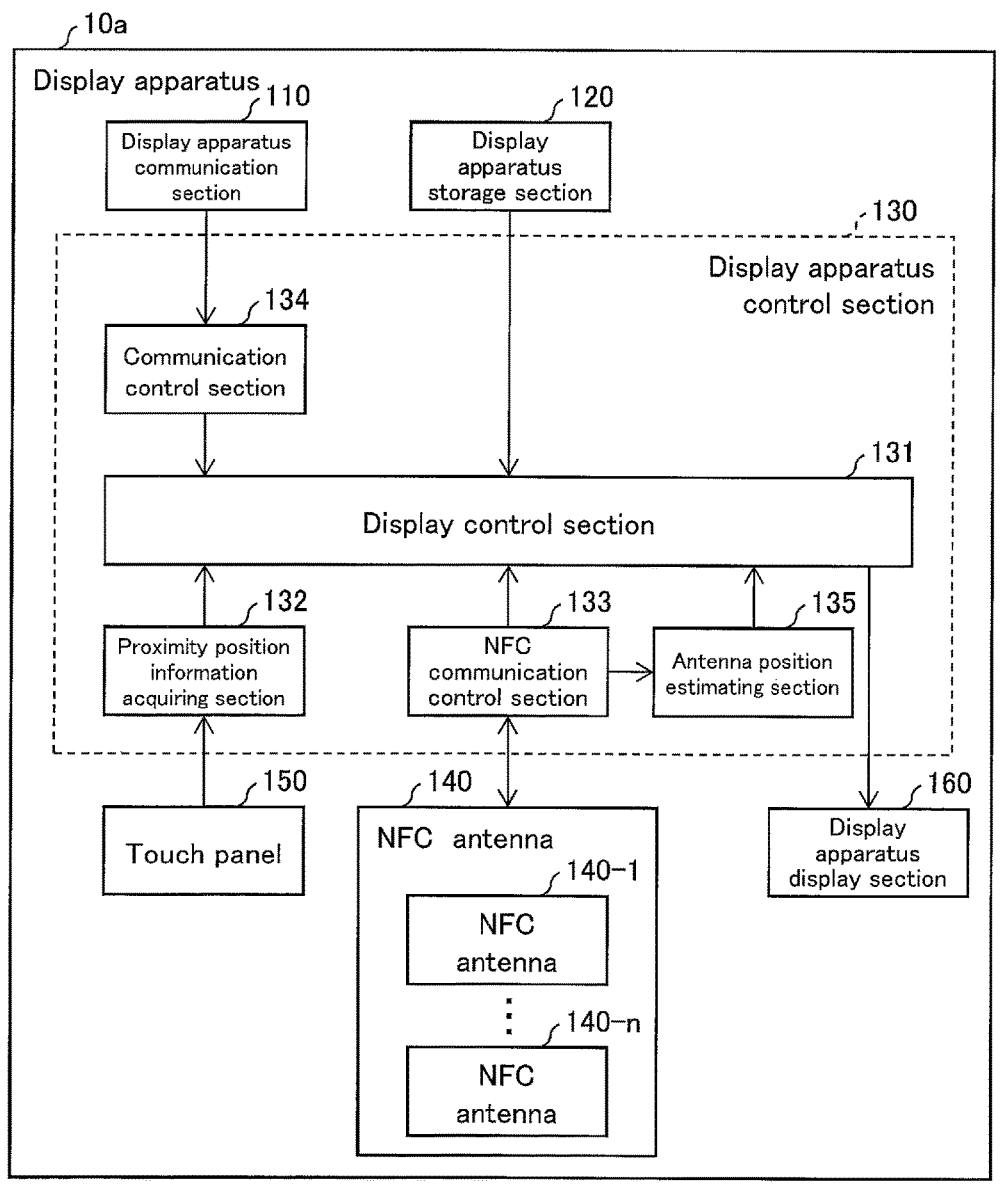

FIG. 9 is a functional block diagram illustrating main components of a display apparatus in accordance with Embodiment 2 of the present invention.

Figure 10:
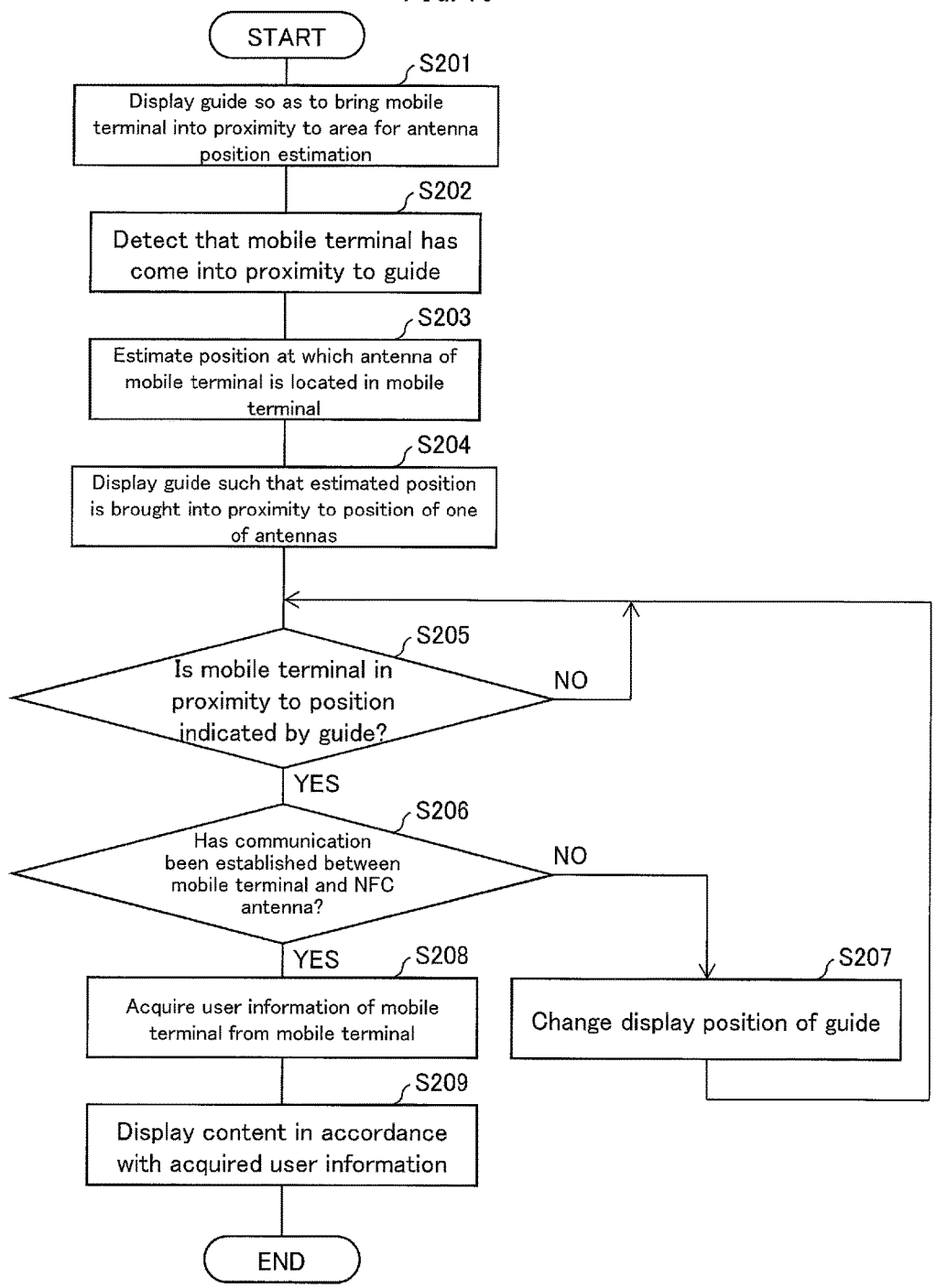

FIG. 10 is a flow chart illustrating a flow of processing in the display apparatus in accordance with Embodiment 2 of the present invention.

Figure 11:
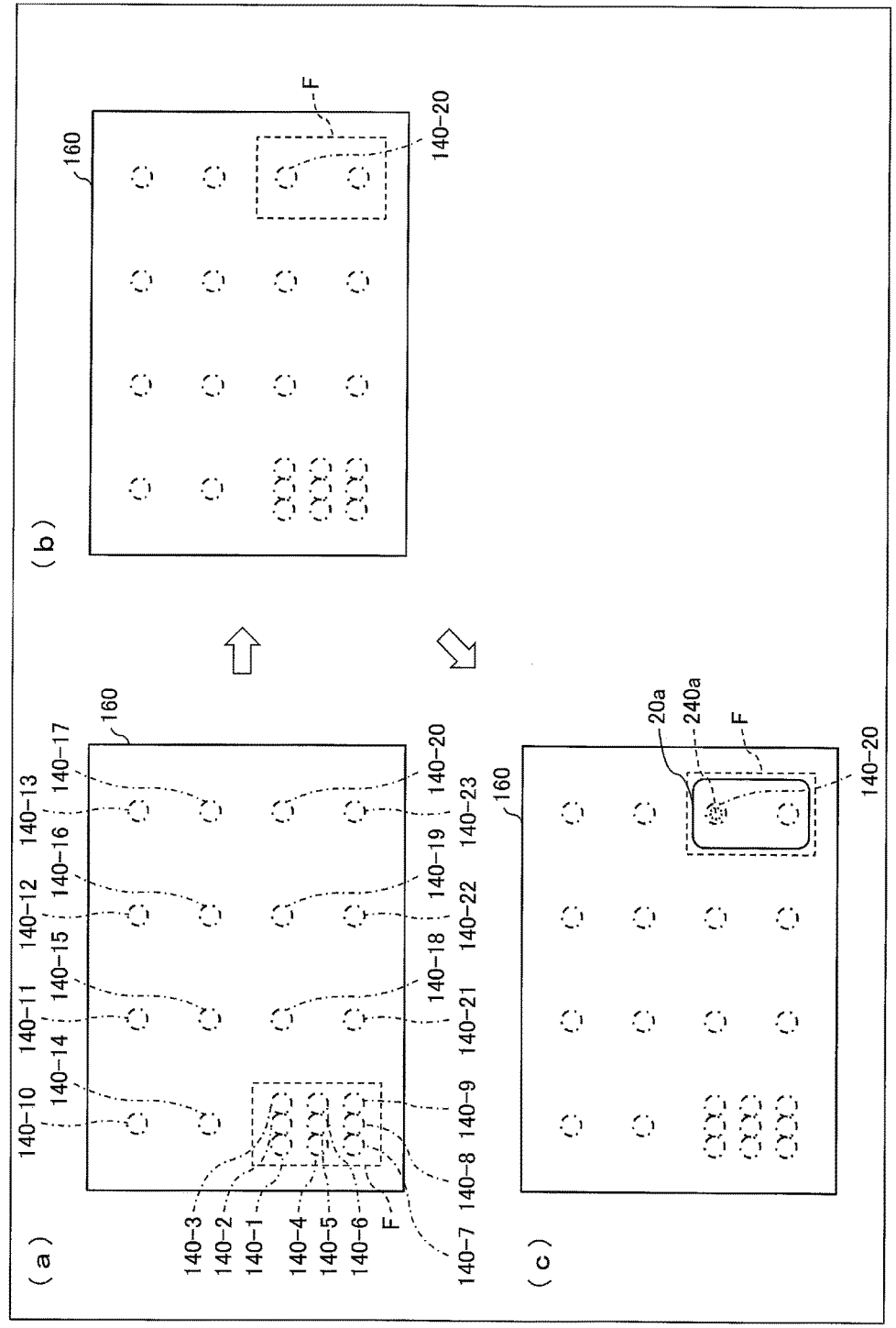

FIG. 11 is a diagram illustrating an example of display screen transitions in the display apparatus in accordance with Embodiment 2 of the present invention.

Figure 12:
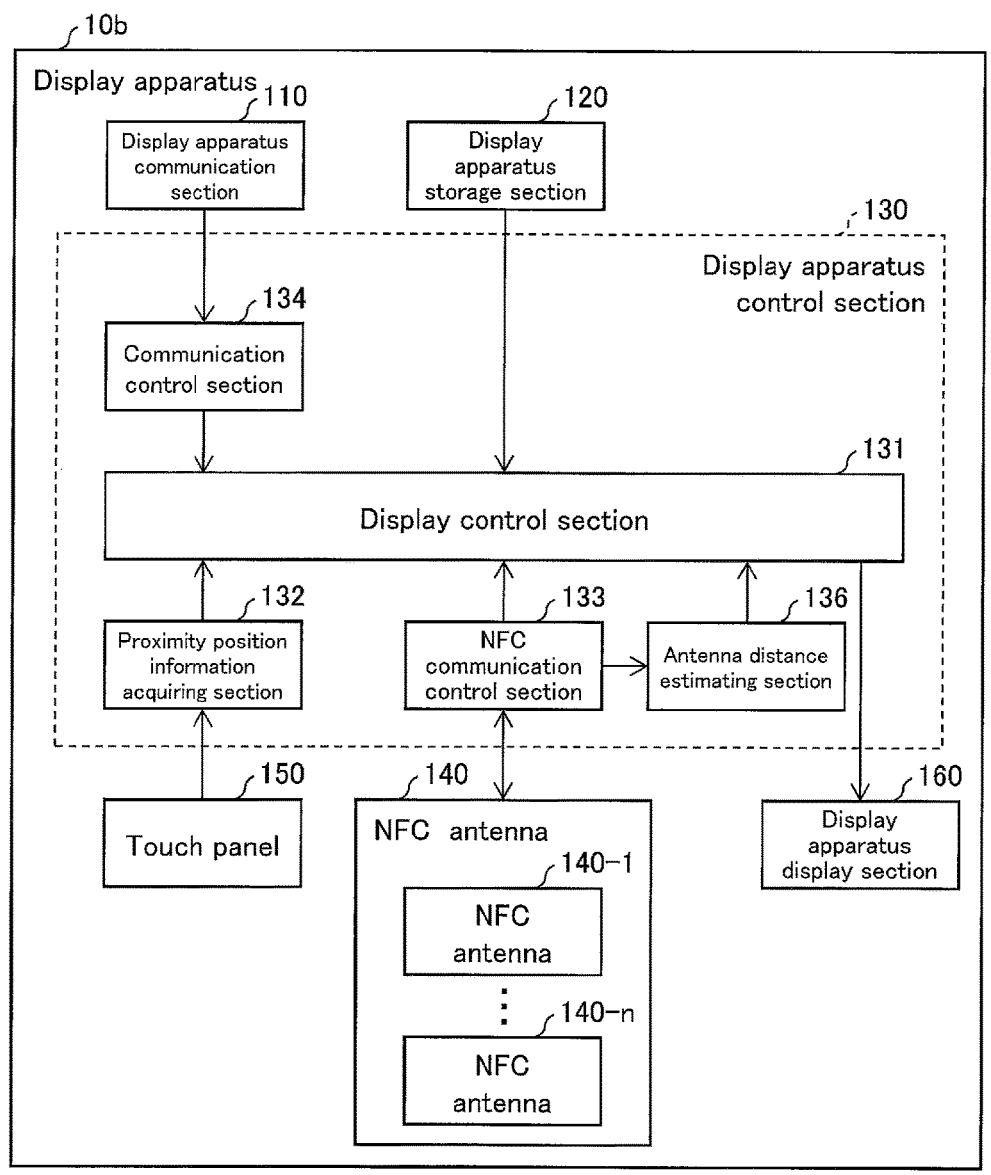

FIG. 12 is a functional block diagram illustrating main components of a display apparatus in accordance with Embodiment 3 of the present invention.

Figure 13:
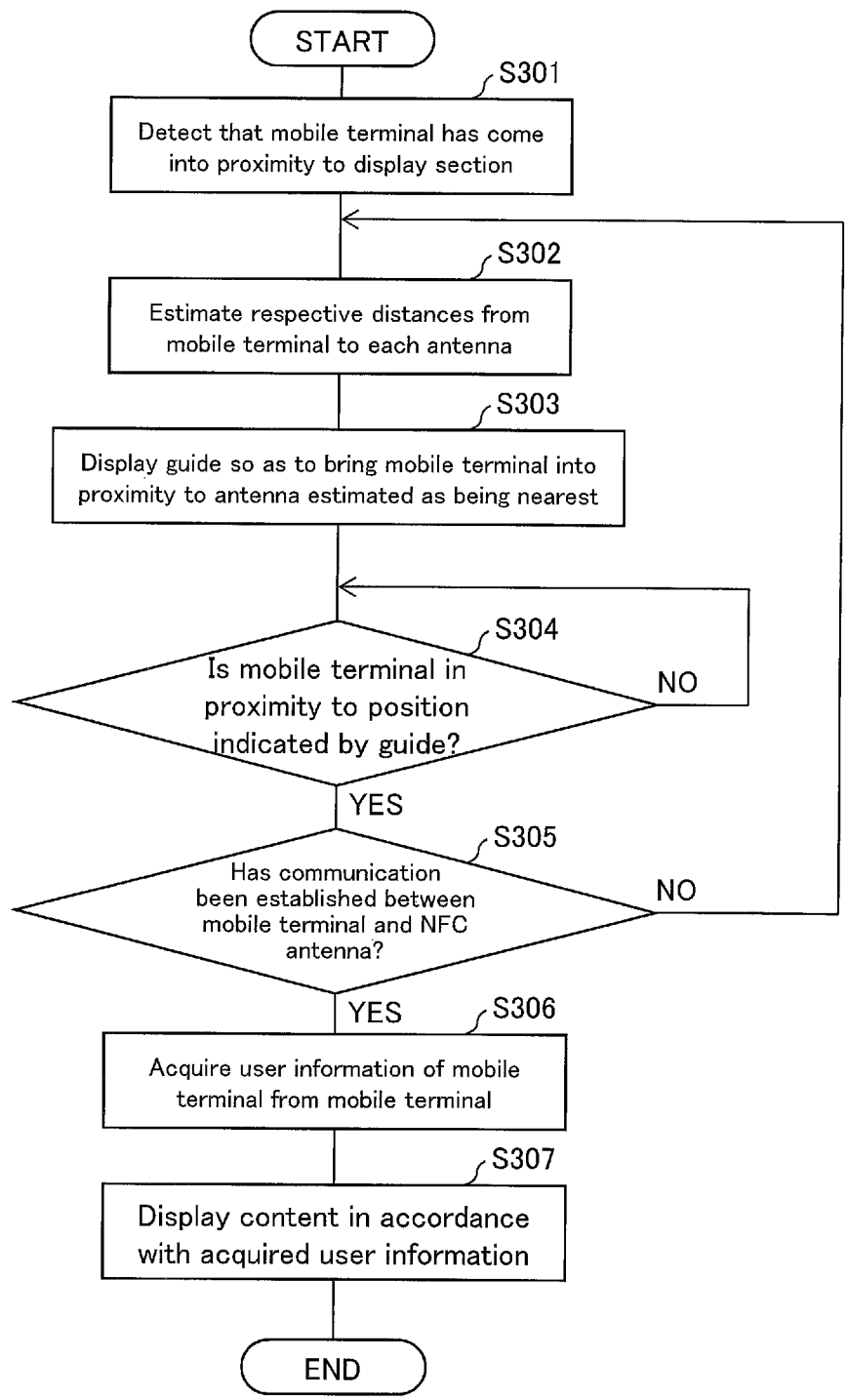

FIG. 13 is a flow chart illustrating a flow of processing in the display apparatus in accordance with Embodiment 3 of the present invention.

Figure 14:
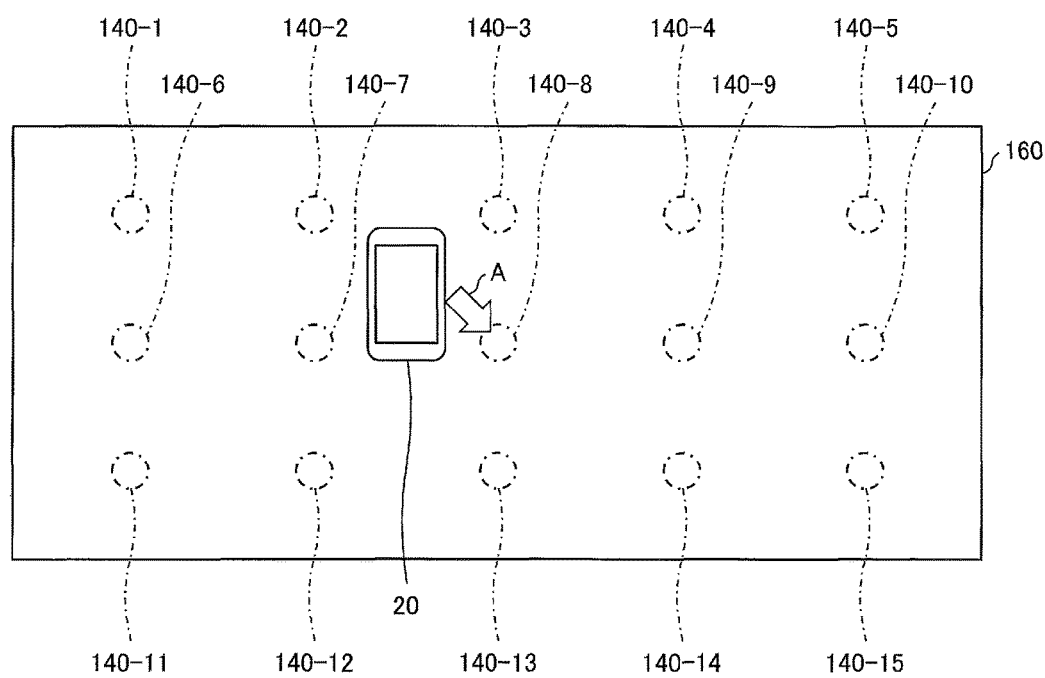

FIG. 14 is a diagram illustrating an example of a display screen of the display apparatus in accordance with Embodiment 3 of the present invention.

Figure 15:
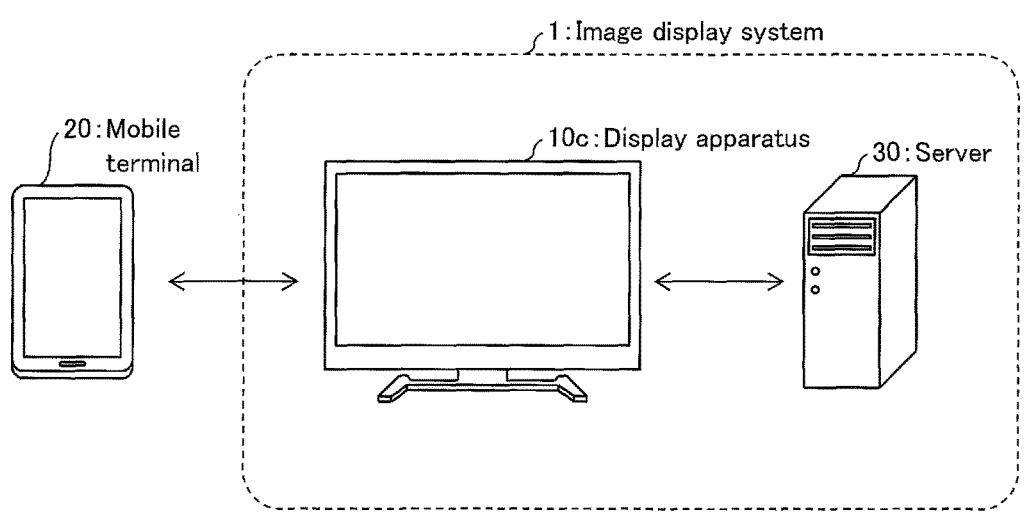

FIG. 15 is a diagram schematically illustrating an image display system in accordance with Embodiment 4 of the present invention.

Figure 16:
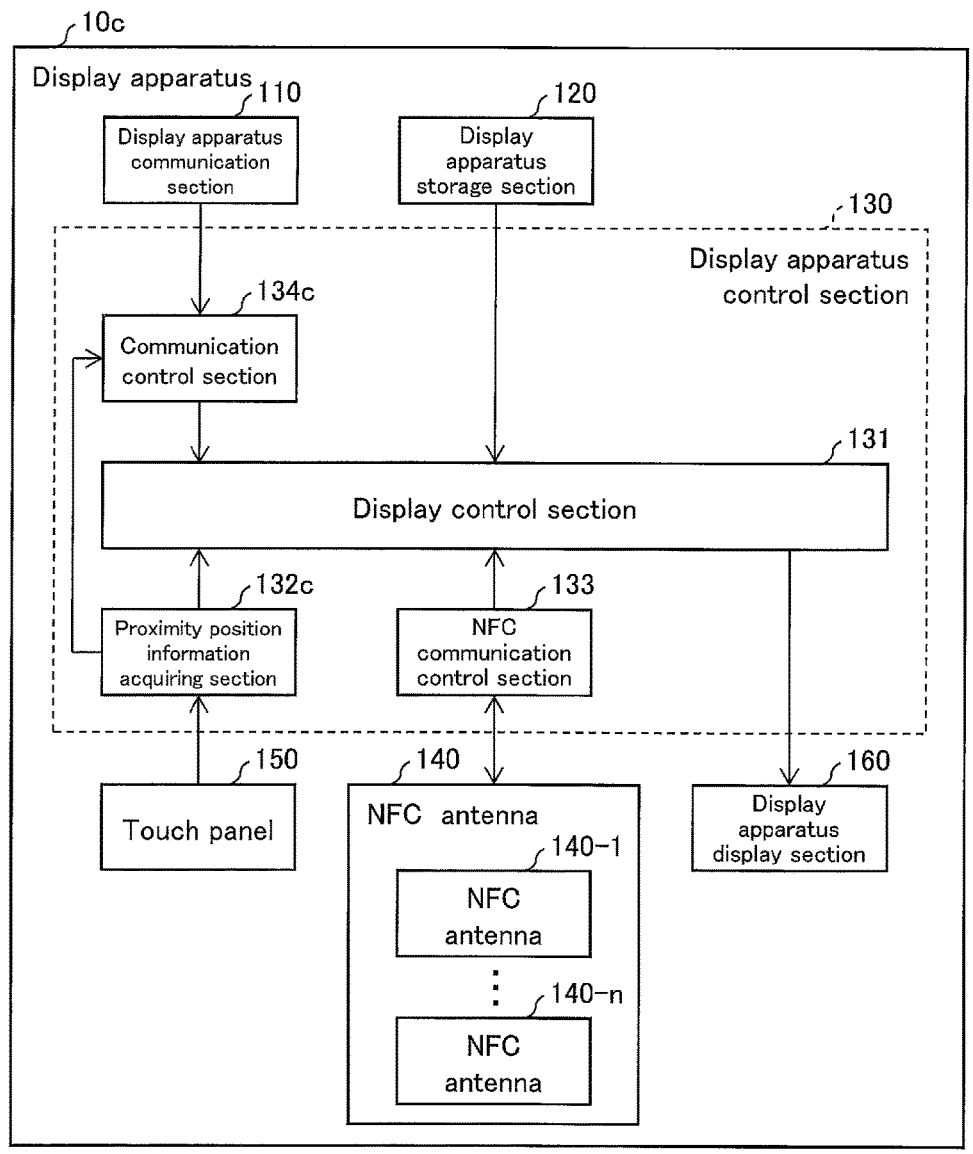

FIG. 16 is a block diagram illustrating main components of a display apparatus in accordance with Embodiment 4 of the present invention.

Figure 17:
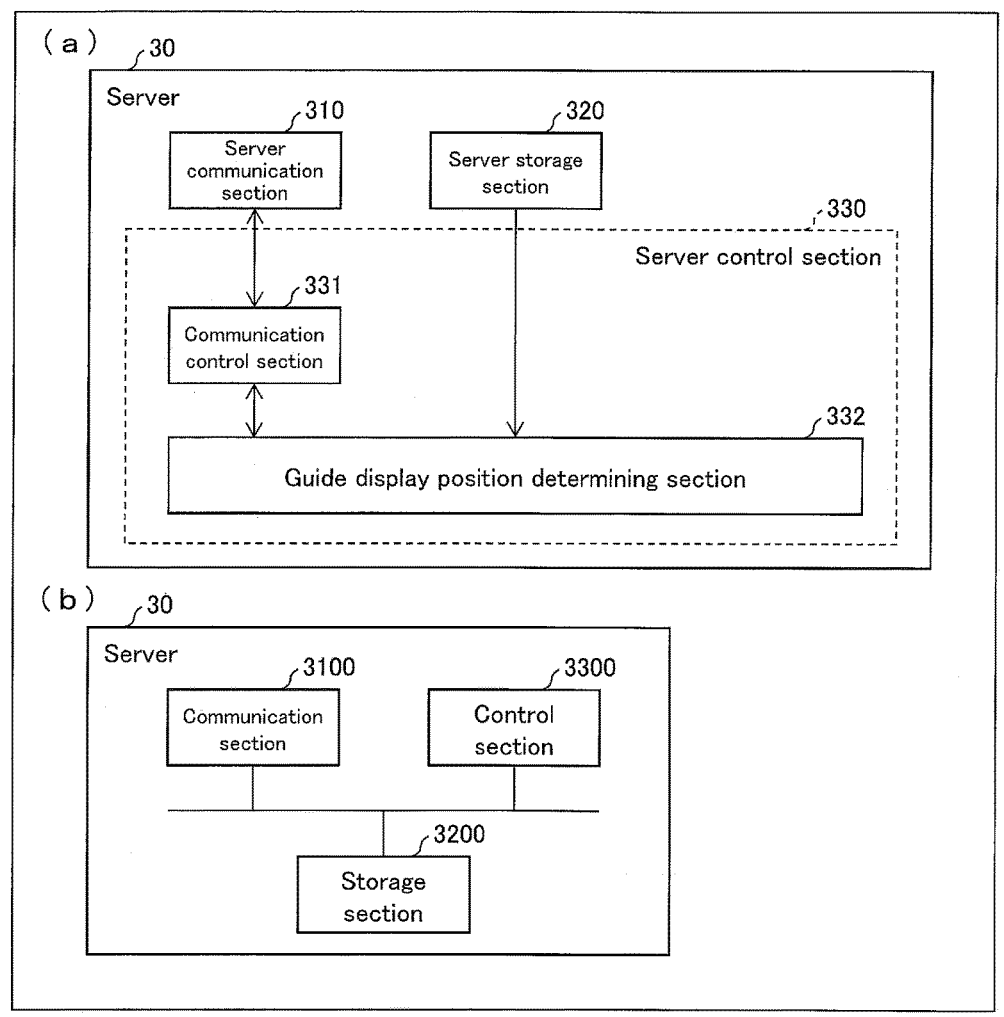

(a) of FIG. 17 is a functional block diagram illustrating main components of a server in Embodiment 4 of the present invention, (b) of FIG. 17 is a block diagram illustrating a hardware configuration of the server in Embodiment 4 of the present invention.

Figure 18:
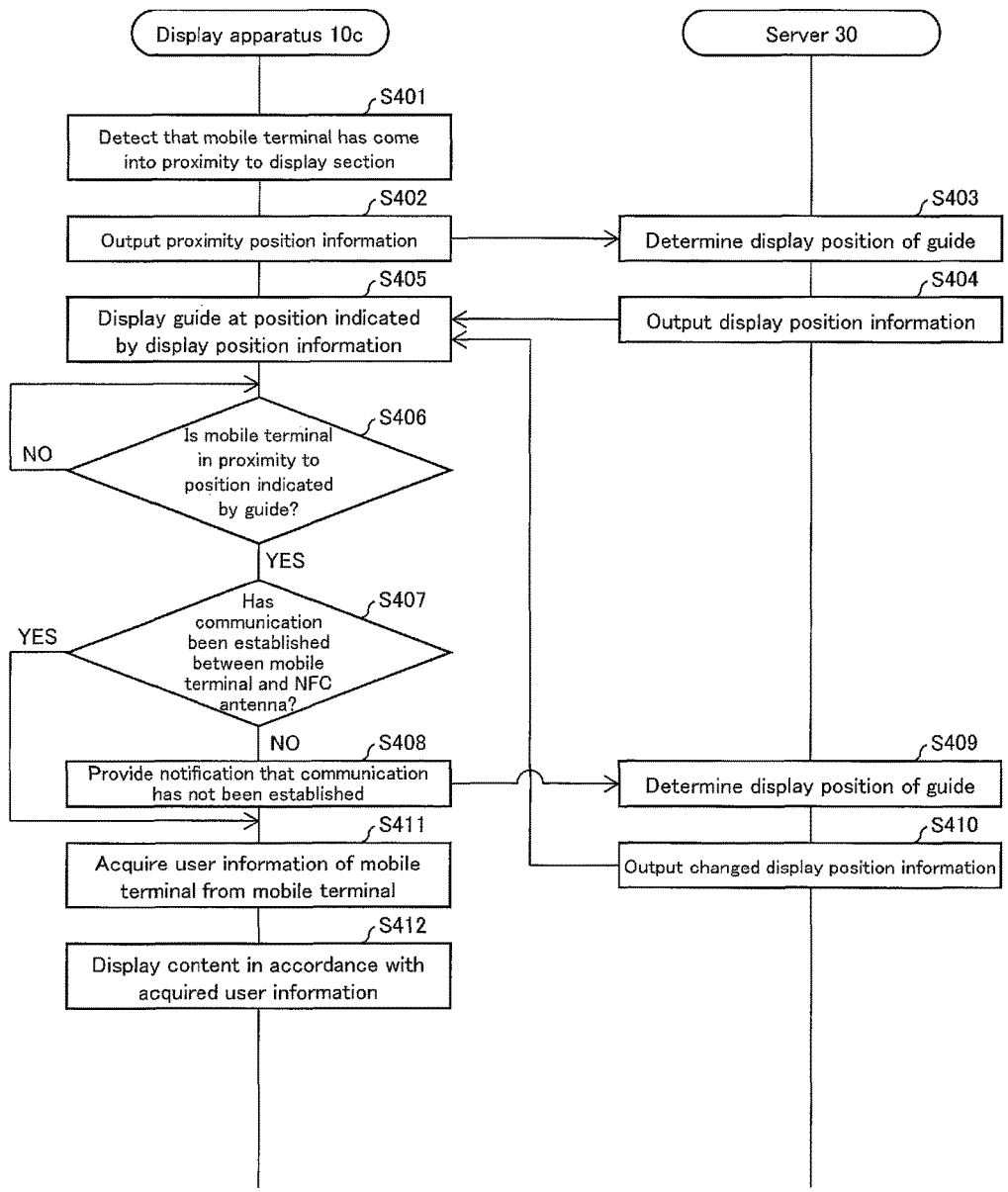

FIG. 18 is a sequence diagram illustrating a flow of processing in the image display system 1 in accordance with Embodiment 4 of the present invention.

Figure 19:
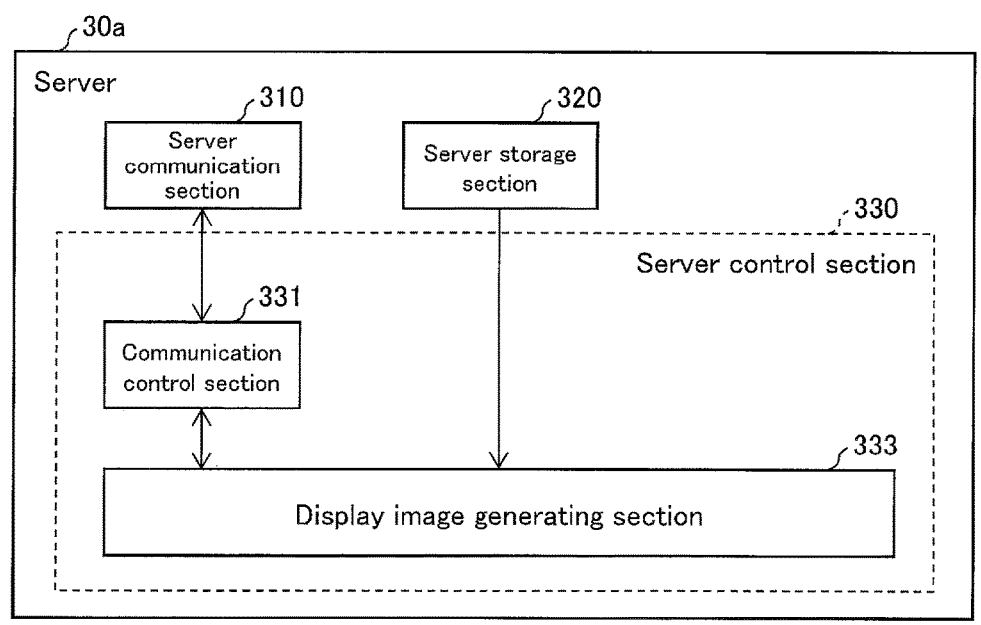

FIG. 19 is a functional block diagram illustrating main components of a server included in an image display system in accordance with Embodiment 5 of the present invention.

Figure 20:
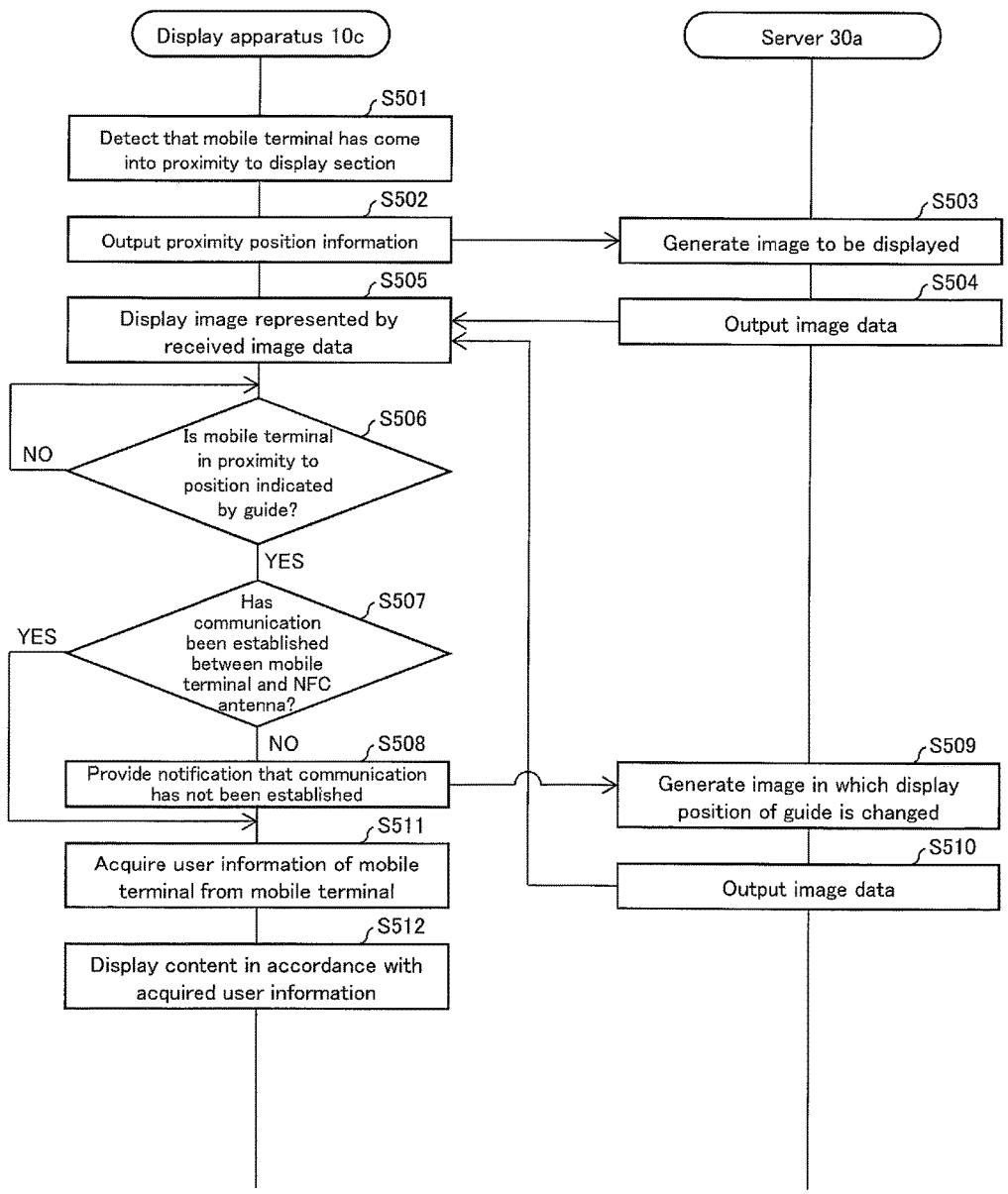

FIG. 20 is a sequence diagram illustrating a flow of processing in the image display system in accordance with Embodiment 5 of the present invention.

DESCRIPTION OF EMBODIMENTS

Embodiment 1

The following description will discuss, in detail, an embodiment of the present invention. In certain embodiments below, descriptions of some configurations may be omitted as necessary. Any configuration which is described in one embodiment but not in another is to be considered the same in each embodiment. Note also that, for convenience, members having functions identical to those of the respective members of each other embodiment are given respective identical reference numerals, and a description of those members is omitted as necessary.

Examples of a display apparatus 10 in accordance with Embodiment 1 encompass a digital signage device. The display apparatus 10 includes at least one NFC antenna 140 which positionally overlaps with a display section. The at least one NFC antenna 140 is an antenna for carrying out near field communication with a mobile terminal. Communication between the mobile terminal and the display apparatus 10 is established by bringing the mobile terminal into proximity with the at least one NFC antenna 140. By carrying out near field communication with the mobile terminal, the display apparatus 10 performs such operations as acquiring user information relating to the user of the mobile terminal. After referring to the user information, the display apparatus 10 can display a screen which provides information suited to the user. This enables the display apparatus 10 to provide information suited to nearby users.

(Display Apparatus 10)

Figure 1:
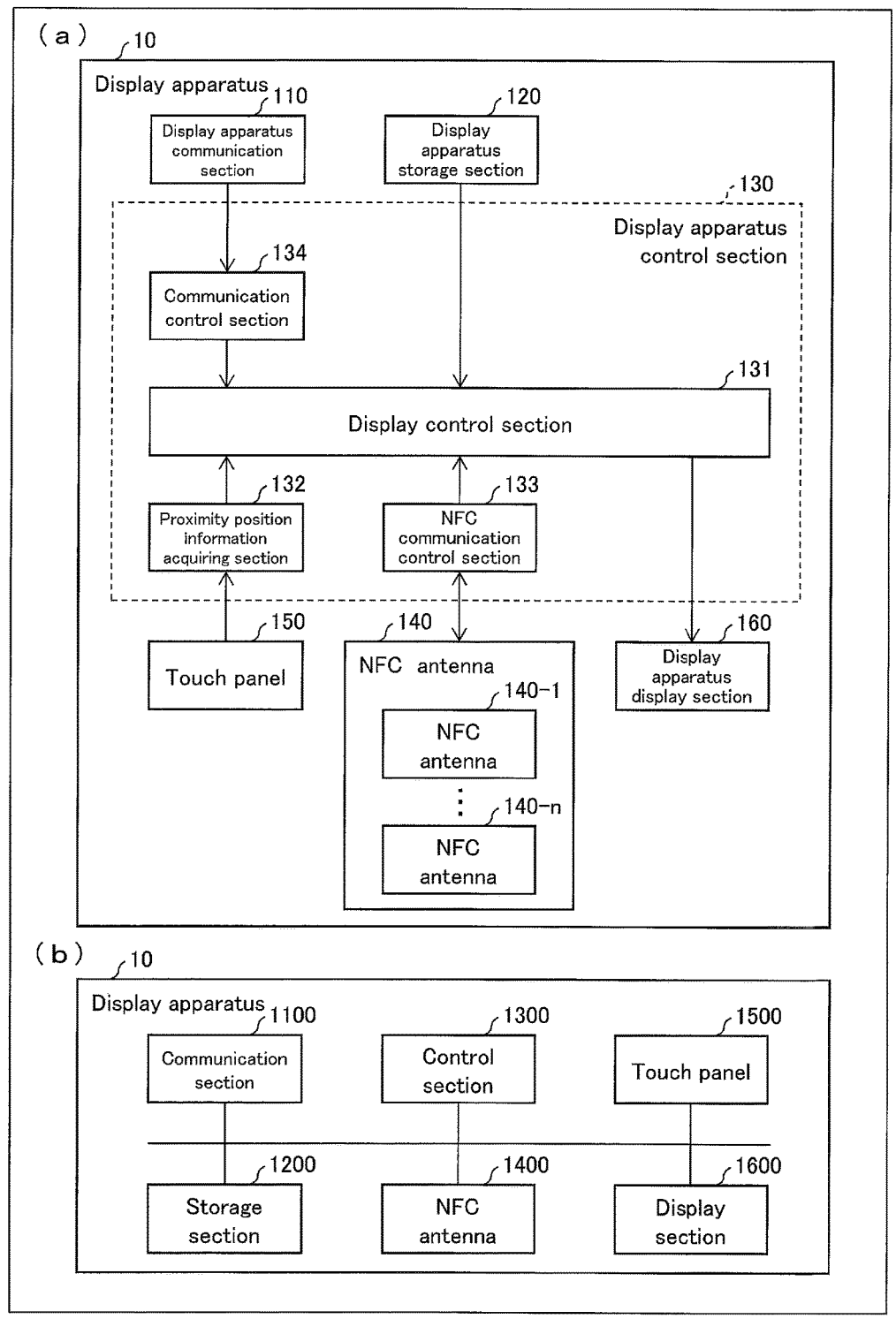

(a) of FIG. 1 is a functional block diagram illustrating main components of the display apparatus 10 in accordance with Embodiment 1, As illustrated in (a) of FIG. 1, the display apparatus 10 includes a display apparatus communication section 110 (information acquiring section), a display apparatus storage section 120, a display apparatus control section 130, the at least one NFC antenna 140, a touch panel ISO (information acquiring section), and a display apparatus display section 160.

The display apparatus communication section 110 serves as an information acquiring section for acquiring various types of information, via a network, from a mobile terminal 20. Examples of information which the display apparatus communication section 110 acquires from the mobile terminal 20 includes model information, which indicates the model of the mobile terminal 20. The display apparatus communication section 110 may also be configured to further acquire an output signal from a gyroscopic sensor included in the mobile terminal 20.

The display apparatus storage section 120 stores a control program for operating the display apparatus 10, an application which operates on the display apparatus 10, and moving image data representing content which the display apparatus 10 displays on the display apparatus display section 160. The display apparatus storage section 120 also stores a model information table in which (i) the model information of the mobile terminal, (ii) shape information, and (iii) antenna position information are associated with each other. The shape information indicates a shape of the mobile terminal indicated by the model information, while the antenna position information indicates a position of an NFC antenna in the mobile terminal indicated by the model information. The display apparatus storage section 120 can further store image data of a guide used for bringing the mobile terminal 20 into proximity to the at least one NFC antenna 140. In such a case, the image data and the model information are preferably associated with each other in the model information table stored in the display apparatus storage section 120.

As illustrated in (a) of FIG. 1, the display apparatus control section 130 also functions as a display control section 131, a proximity position information acquiring section 132 (information acquiring section), an NFC communication control section 133, and a commutation control section 134 (information acquiring section).

The display control sect ion 131 controls the display apparatus display section 160 so that the display apparatus display section 160 displays the content stored as moving image data in the display apparatus storage section 120. In a case where the mobile terminal 20 has come into proximity with the display apparatus display section 160, the display control section 131 also causes the display apparatus display section 160 to display the guide, used for bringing the mobile terminal 20 into proximity with the at least one NFC antenna 140, such that the guide is superimposed on the content being displayed by display apparatus display section 160. For example, the display control section 131 refers to information provided by (i) the proximity position information acquiring section 132 and (ii) the communication control section 134 (described later), and then causes the display apparatus display section 160 to display, as the guide, a box having a shape in accordance with the information. The display control section 131 changes a display position of the guide in accordance with the content being displayed on the display apparatus display section 160. Furthermore, in a case where near field communication has been established between the display apparatus 10 and the mobile terminal 20, the display control section 131 causes the display apparatus display section 160 to display content suited to the user of the mobile terminal 20. Note that an example of the guide which the display control section 131 can display will be described later with reference to another drawing.

The proximity position information acquiring section 132 receives, from the touch panel 150, a notification indicating that the mobile terminal 20 has come into proximity to the display apparatus display section 160. The proximity position information acquiring section 132 then sends the notification to the display control section 131. Note, here, that in the present specification, "proximity" refers to a state where the distance between (i) the mobile terminal 20 and (ii) the display apparatus display section 160 is equal to or less than a certain distance. Therefore, in the present specification, "proximity" also includes a state where the mobile terminal 20 and the display apparatus display section 160 are in contact with each other.

Receipt of the notification from the proximity position information acquiring section 132 triggers the display control section 131 to commence processing to superimpose the guide onto the content being displayed. The proximity position information acquiring section 132 also acquires proximity position information, which indicates a proximity position of the mobile terminal 20 which is in proximity to the display apparatus display section 160. Here, "proximity position" refers to a position obtained by projecting an outline of the housing of the mobile terminal 20 onto the display apparatus display section 160 in a direction normal to the display apparatus display section 160. The housing of a mobile terminal is generally likely to have a rectangular shape. As such, the proximity position information acquiring section 132 can identify the shape of the mobile terminal 20 by extracting, from the proximity position information that has been acquired, the respective proximity positions of the four corners of the housing of the mobile terminal 20. That is, the proximity position information acquiring section 132 also serves as an information acquiring section which acquires shape information indicating the shape of the mobile terminal 20 which is in proximity to the display apparatus display section 160. The proximity position information acquiring section 132 provides, to the display control section 131, the shape information thus acquired.

The NFC communication control section 133 serves to control communication, specifically communication carried out via the at least one NFC antenna 140. In a case where near field communication has been established between the at least one NFC antenna 140 and the mobile terminal 20, the NFC communication control section 133 acquires, from the mobile terminal 20 and via the at least one NFC antenna 140, user information relating to the user of the mobile terminal 20. The NFC communication control section 133 supplies, to the display control section 131, the user information thus acquired.

The communication control section 134 serves to control communication, specifically communication carried out via the display apparatus communication section 110. The communication control section 134 supplies, to the display control section 131, the model information of the mobile terminal 20 acquired by the display apparatus communication section 110.

The at least one NFC antenna 140 is an antenna for carrying out near field communication with the mobile terminal 20. The at least one NFC antenna 140 is provided so as to positionally overlap with the display apparatus display section 160. Specifically, the at least one NFC antenna 140 is provided, for example, behind the display apparatus display section 160. In Embodiment 1, the at least one NFC antenna 140 includes a plurality of NFC antennas 140-1 through 140-*n* (n being an integer not less than 2). The positioning of each of the NFC antennas 140-1 through 140-*n* is described later with reference to another drawing.

The touch panel 150 is provided integrally with the display apparatus display section 160 and is configured to detect that the mobile terminal 20 has come into proximity to the display apparatus display section 160. In a case where it is detected that the mobile terminal 20 has come into proximity to the display apparatus display section 160, the touch panel 150 sends notification of such to the proximity position information acquiring section 132. The touch panel 150 also supplies, to the proximity position information acquiring section 132, proximity position information indicating the proximity position of the mobile terminal 20 detected as being in proximity to the display apparatus display section 160. The touch panel 150 also serves to receive a touch operation inputted via an operation implement (such as the user's finger or a stylus).

The display apparatus display section 160 is a display for displaying content and is controlled by the display control section 131.

(Hardware Configuration of the Display Apparatus 10)

(b) of FIG. 1 is a block diagram illustrating a hardware configuration of the display apparatus 10 of Embodiment 1.

As illustrated in (b) of FIG. 1, the display apparatus 10 includes a communication section 1100, a storage section 1200, a control section 1300, an NFC antenna 1400, a touch panel 1500, and a display section 1600.

The communication section 1100 is an interface for enabling communication with the mobile terminal 20 via a network. The communication section 1100 realizes the functions of the display apparatus communication section 110.

The storage section 1200 includes a main storage section and an auxiliary storage section. Examples of devices which can be used as the main storage section of the storage section 1200 encompass semiconductor RAM (random access memory). Examples of the devices which can be used as the auxiliary storage section of the storage section 1200 encompass a hard disk drive (HDD). The auxiliary storage section stores a control program for operating the display apparatus 10. The control program is for realizing the functions of the display apparatus control section 130.

The control section 1300 realizes the functions of the display apparatus control section 130 by (i) loading the control program on the main storage section of the storage section 1200 and (ii) executing various instructions contained in the control program thus loaded. Examples of devices which can be used as the control section 1300 encompass a CPU (Central Processing Unit).

The NFC antenna 1400 is an antenna for carrying out near field communication with the mobile terminal 20. The NFC antenna 1400 realizes the functions of the at least one NFC antenna 140.

The touch panel 1500 is a touch sensor for detecting the proximity position, with respect to the display section 1600, of a mobile terminal or an operation implement. Examples of the touch panel 1300 encompass a capacitive touch sensor and an infrared touch sensor. The touch panel 1500 realizes the functions of the touch panel 150.

The display section 1600 is a display for displaying the content. The display section 1600 realizes the functions of the display apparatus display section 160.

(Mobile Terminal 20)

Figure 2:
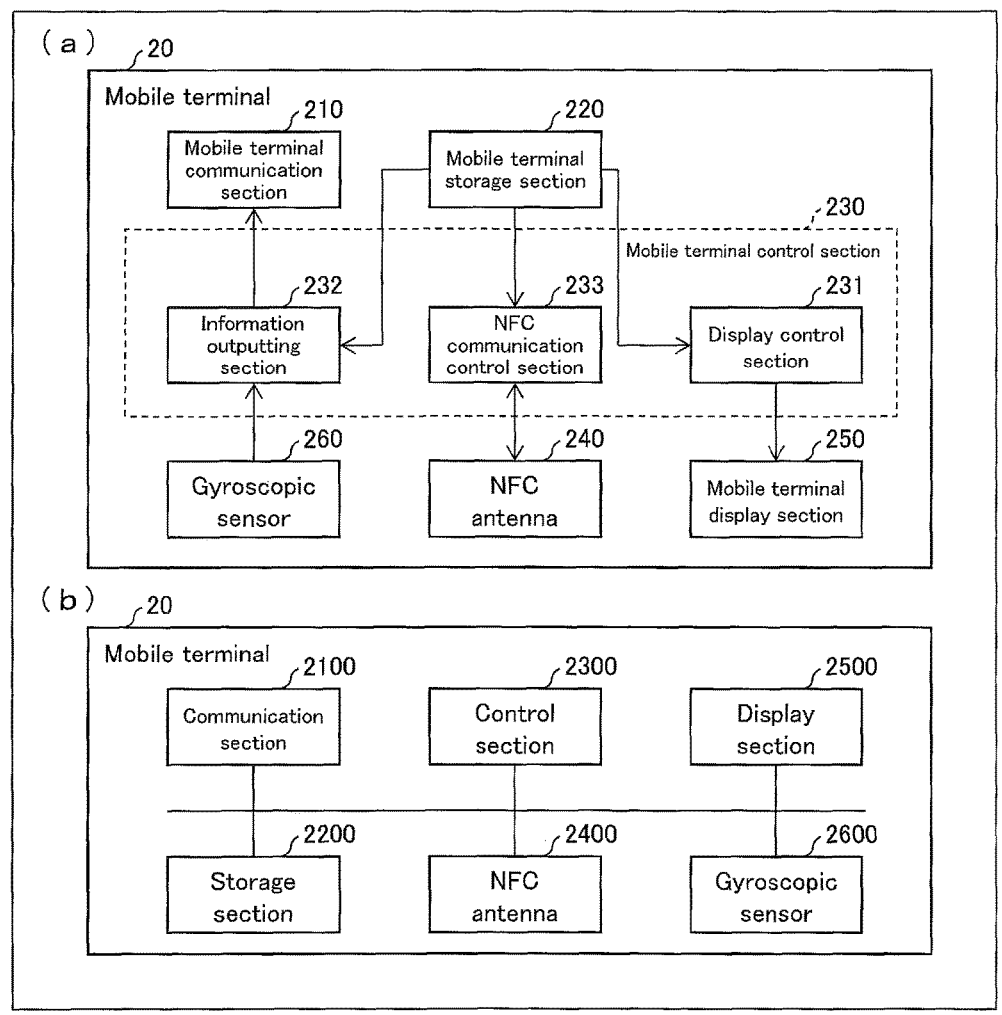

(a) of FIG. 2 is a functional block diagram illustrating main components of the mobile terminal 20 in Embodiment 1. As illustrated in (a) of FIG. 2, the mobile terminal 20 includes a mobile terminal communication section 210, a mobile terminal storage section 220, a mobile terminal control section 230, an NFC antenna 240, a mobile terminal display section 250, and a gyroscopic sensor 260.

The mobile terminal communication section 210 serves to provide various information to the display apparatus 10 via a network. For example, the mobile terminal communication section 210 provides, to the display apparatus 10, (i) model information of the mobile terminal 20 and (ii) an output signal from the gyroscopic sensor 260 (described later).

The mobile terminal storage section 220 stores a control program for operating the mobile terminal 20 and an application which operates on the mobile terminal 20. The mobile terminal storage section 220 also stores model information of the mobile terminal 20 and user information relating to the user of the mobile terminal 20.

As illustrated in in (a) of FIG. 2, the mobile terminal control section 230 also functions as a display control section 231, an information outputting section 232, and an NFC communication control section 233.

The display control section 231 serves to control the mobile terminal display section 250. For example, the display control section 231 controls the mobile terminal display section 250 such that the mobile terminal display section 250 displays a video image which indicates a result of executing an application stored in the mobile terminal storage section 220.

The information outputting section 232 serves to control communication, specifically communication carried out by the mobile terminal communication section 210. The information outputting section 232 provides, to the display apparatus 10 and via the mobile terminal communication section 210, (i) model information, of the mobile terminal 20, which is stored in the mobile terminal storage section 220, and (ii) an output signal from the gyroscopic sensor 260 (described later).

The NFC communication control section 233 serves to control communication, specifically communication carried out via the NFC antenna 240. In a case where near field communication has been established between the NFC antenna 240 and the display apparatus 10, the NFC communication control section 233 provides, to the display apparatus 10 and via the NFC antenna 240, the user information of the mobile terminal 20 which information is stored in the mobile terminal storage section 220.

The NFC antenna 240 is an antenna for carrying out near field communication with the display apparatus 10.

The mobile terminal display section 250 is controlled by the display control section 231 and displays an image represented by the moving image data supplied by the display control section 231.

The gyroscopic sensor 260 serves to detect an attitude of the mobile terminal 20. That is, the gyroscopic sensor 260 detects an angle of incline of the mobile terminal 20 with respect to the horizon. The gyroscopic sensor 260 supplies, as an output signal to the information outputting section, attitude information indicating a detected attitude of the mobile terminal 20.

(Hardware Configuration of Mobile Terminal 20)

(b) of FIG. 2 is a block diagram illustrating a hardware configuration of the mobile terminal 20 in Embodiment 1. As illustrated in (b) of FIG. 2, the mobile terminal 20 includes a communication section 2100, a storage section 2200, a control section 2300, an NFC antenna 2400, a display section 2500, and a gyroscopic sensor 2600.

The communication section 2100 is an interface for enabling communication with the display apparatus 10 via a network. The communication section 2100 realizes the functions of the mobile terminal communication section 210.

The storage section 2200 includes a main storage section and an auxiliary storage section. Examples of devices which can be used as the main storage section of the storage section 2200 encompass semiconductor RAM (random access memory). Examples of the devices which can be used as the auxiliary storage section of the storage section 2200 encompass a hard disk drive (HDD). The auxiliary storage section stores a control program for operating the mobile terminal 20. The control program is for realizing the functions of the mobile terminal control section 230.

The control section 2300 realizes the functions of the mobile terminal control section 230 by (i) loading the control program on the main storage section of the storage section 2200 and (ii) executing various instructions contained in the control program thus loaded. Examples of devices which can be used as the control section 2300 encompass a CPU (Central Processing Unit).

The NFC antenna 2400 is an antenna for carrying out near field communication with the display apparatus 10. The NFC antenna 2400 realizes the functions of the NFC antenna 240.

The display section 2500 is a display for displaying content. The display section 2500 realizes the functions of the mobile terminal display section 250.

The gyroscopic sensor 2600 is a sensor for detecting the attitude of the mobile terminal 20. The gyroscopic sensor 2600 realizes the functions of the gyroscopic sensor 260.

(Flow of Processing in Display Apparatus 10)

Figure 3:
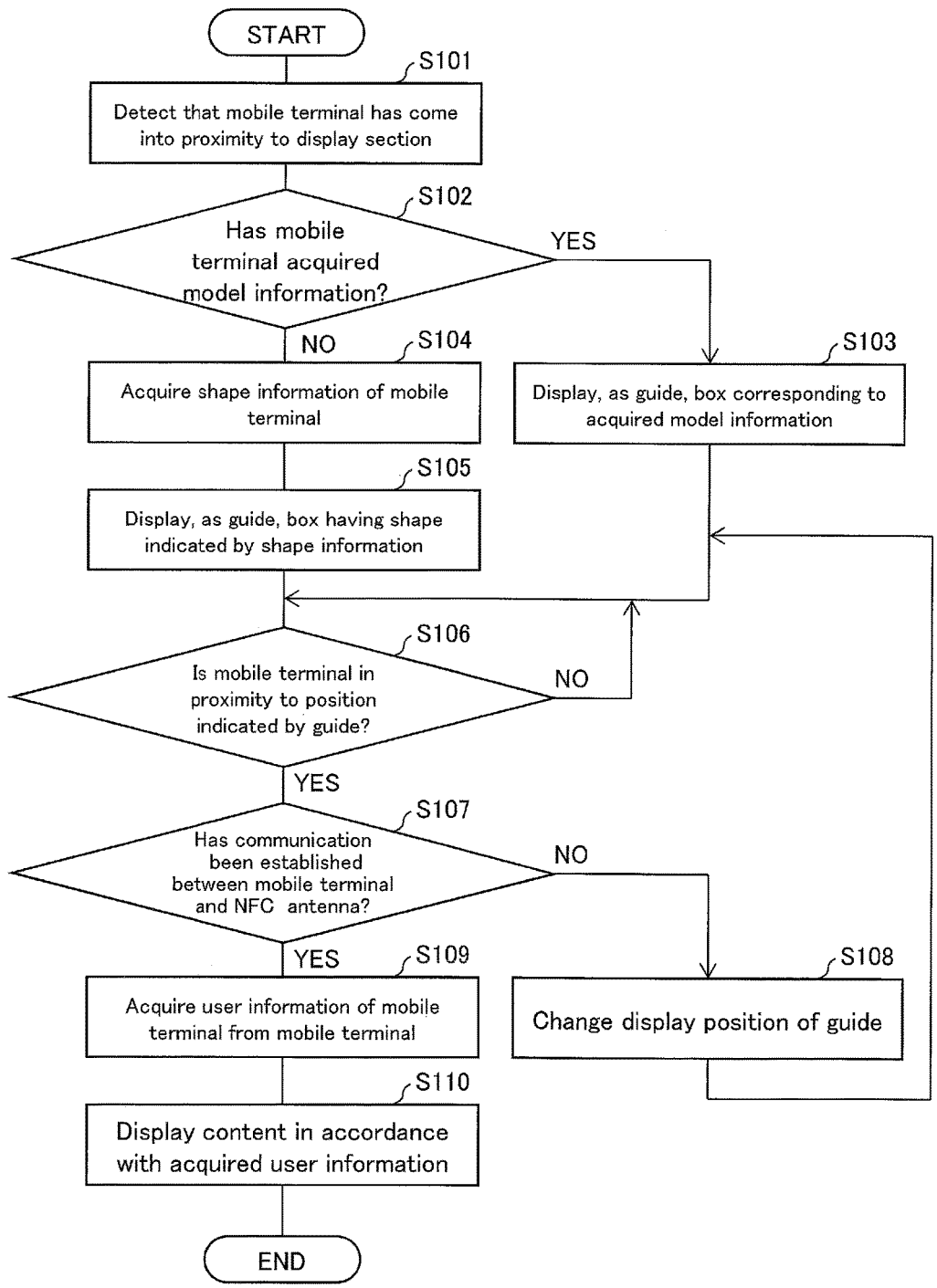
FIG. 3 is a flow chart illustrating a flow of processing in the display apparatus in accordance with Embodiment 1 of the present invention.

The following description will discuss, with reference to FIG. 3, a flow of processing in the display apparatus 10. FIG. 3 is a flow chart illustrating a flow of processing in the display apparatus 10 in accordance with Embodiment 1.

(Step S101)

The touch panel 150 of the display apparatus 10 detects that the mobile terminal 20 has come into proximity to the display apparatus display section 160. The touch panel 150 sends, to the proximity position information acquiring section. 132, a notification indicating that the mobile terminal 20 has come into proximity to the display apparatus display section 160. Note, here, that the touch panel 150 is preferably configured to send, to the proximity position information acquiring section 132, a notification indicating that an object has come into proximity to the display apparatus display section 160 in a case where the object is rectangular and has a size within a predetermined range. Such a configuration makes it possible to skip displaying the guide in a case where, for example, a gesture operation has been carried out on the display apparatus display section 160 by an operation implement (such as the user's finger or a stylus). The proximity position information acquiring section 132 sends, to the display control section 131, the notification received from the touch panel 150. Receipt of the notification from the proximity position information acquiring section 132 triggers the display control section 131 to commence processing to display the guide.

Note that the display apparatus 10 may be configured such that, prior to the step S101, the display apparatus display section 160 displays an image or text that prompts the user to bring the mobile terminal 20 into proximity to the display apparatus display section 160. In such a configuration, in order to avoid hindering viewing of the content being displayed, it is preferable that (i) the prompting image blinks on the screen at a certain time interval or (ii) the prompting text scrolls.

(Step S102)

Next, in a case where the display apparatus 10 has acquired the model information from the mobile terminal 20 via the display apparatus communication section 110, the processing proceeds to step S103. In a case where the display apparatus 10 has not acquired the model information from the mobile terminal 20, the processing proceeds to step S104. Note that in a case where it has been set in advance which mobile terminal models are capable of carrying out near field communication with the display apparatus 10, step S102 is omitted, and the processing proceeds to step S103.

(Step S103)

In a case where the display apparatus 10 has acquired the model information of the mobile terminal 20, the display control section 131 (i) refers to the model information table stored in the display apparatus storage section 120 and (ii) causes the display apparatus display section 160 to display, as the guide, a box corresponding to the model indicated by the model information. Thereafter, processing in the display apparatus 10 proceeds to step S106. Note that processing for displaying a box corresponding to a model will be described later with reference to another drawing.

(Step S104)

In a case where the display apparatus 10 has not acquired the model information of the mobile terminal 20, the touch panel 150 supplies, to the proximity position information acquiring section 132, the proximity position information of the mobile terminal 20. The proximity position information acquiring section 132 then (i) refers to the proximity position information thus acquired, (ii) acquires the shape information of the mobile terminal 20, and (iii) supplies the shape information to the display control section 131. The display control section 131 acquires the shape information from the proximity position information acquiring section 132.

(Step S105)

Next, the display control section 131 causes the display apparatus display section 160 to display, as the guide, a box having a shape indicated by the shape information that the display control section 131 has acquired.

(Step S106)

Once the guide is displayed in step S103 or step S105, the display apparatus 10 waits to proceed with processing until the touch panel 150 detects that the mobile terminal 20 has come into proximity with a position indicated by the guide. Note that step S106 may be omitted. That is, the display apparatus 10 may be configured such that, once the guide has been displayed in step S103 or step S105, processing proceeds to step S107, without the touch panel 150 detecting whether or not the mobile terminal 20 has come into proximity to the position indicated by the guide.

(Step S107)

Once the touch panel 150 has detected that the mobile terminal 20 has come into proximity to the position indicated by the guide (or, in a case where step S106 is omitted, once the guide has been displayed in step S103 or step S105), the NFC communication control section 133 determines whether or not communication has been established between the mobile terminal 20 and the at least one NFC antenna 140 (more specifically, any of the NFC antennas 140-1 through 140-$n$). In a case where communication has not been established between the mobile terminal 20 and the at least one NFC antenna 140, the display apparatus 10 proceeds to step S108. In a case where communication between the mobile terminal 20 and the at least one NFC antenna 140 has been established, the display apparatus 10 proceeds to step S109.

(Step S108)

In a case where communication between the mobile terminal 20 and the at least one NFC antenna 140 has not been established in step S107, the display control section 131 changes the display position of the guide being displayed on the display apparatus display section 160. Specifically, the display control section 131 changes the display position of the guide to a position that at least partially overlaps with the current display position. That is, the display control section 131 changes the display position of the guide so as to shift the guide from its current display position. Once the display position of the guide has been changed, the display apparatus 10 returns to step S106. Note that processing for changing the display position of the guide will be described later with reference to another drawing.

(Step S109)

In a case where communication between the mobile terminal 20 and the at least one NFC antenna 140 has been established in step S107, the NFC communication control section 133 acquires, from the mobile terminal 20 and via the at least one NFC antenna 140, the user information of the mobile terminal 20. The NFC communication control section 133 supplies, to the display control section 131, the user information thus acquired.

(Step S110)

Next, the display control section 131 refers to the user information supplied by the NFC communication control section 133 and causes the display apparatus display section 160 to display content, selected from the content stored in the display apparatus storage section 120, which content is suited to the user indicated by the user information.

With the above processing, the display apparatus 10 makes it possible to (i) facilitate the establishment of near field communication with the mobile terminal 20 by displaying the guide indicating a position which the user should bring the mobile terminal 20 in proximity to, and, at the same time, (ii) reduce hindrance of viewing of the displayed content.

(Example of Guide Displayed by Display Apparatus 10)

The following description will discuss, with reference to FIGS. 4 through 8, examples of the guide which the display apparatus 10 displays.

Figure 4:
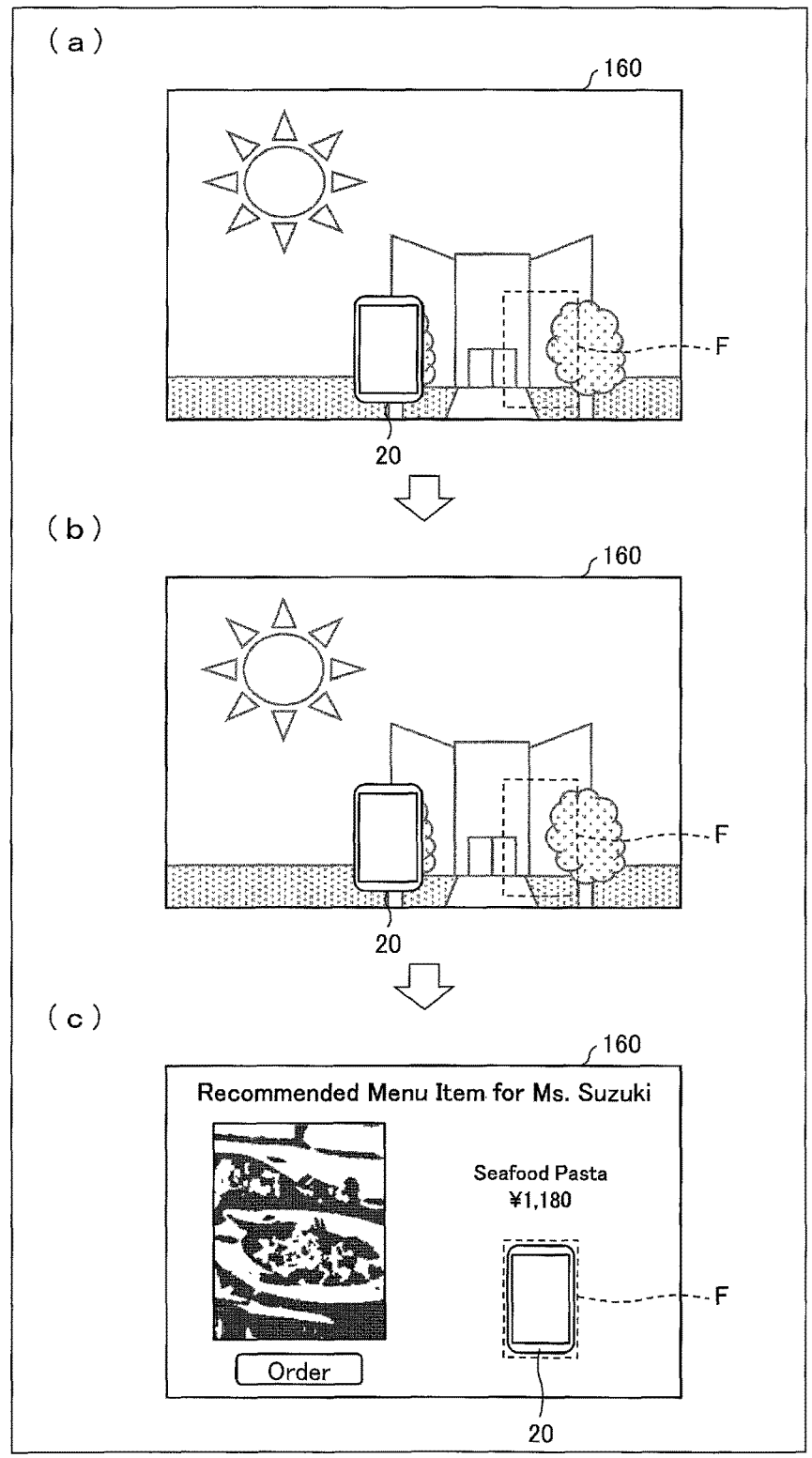
FIG. 4 is a diagram illustrating an example of display screen transitions in the display apparatus in accordance with Embodiment 1 of the present invention.

FIG. 4 is a diagram illustrating an example of display screen transitions in the display apparatus 10. As illustrated in (a) of FIG. 4, the display apparatus display section 160 is displaying content represented by the moving image data stored in the display apparatus storage section 120. As illustrated in (b) of FIG. 4, once the display apparatus 10 detects that the mobile terminal 20 has come into proximity to the display apparatus display section 160, the display apparatus 10 causes the display apparatus display section 160 to display a box F as the guide corresponding to the shape or model of the mobile terminal 20. The box F is indicated by dotted lines in FIG. 4. As illustrated in (c) of FIG. 4, once the display apparatus 10 detects that the mobile terminal 20 has come into proximity to the position indicated by the box F, the display apparatus 10 carries out near field communication with the mobile terminal 20 and causes the display apparatus display section 160 to display content suited to the user of the mobile terminal 20. For example, as illustrated in (c) of FIG. 4, the display apparatus display section 160 displays, as the content suited to the user, an image relating to a "Recommended Menu Item for Ms. Suzuki." In the example illustrated in (c) of FIG. 4, an "Order" button is displayed, and, by touching this button, the user can order the menu item being displayed on the display apparatus display section 160.

Figure 5:
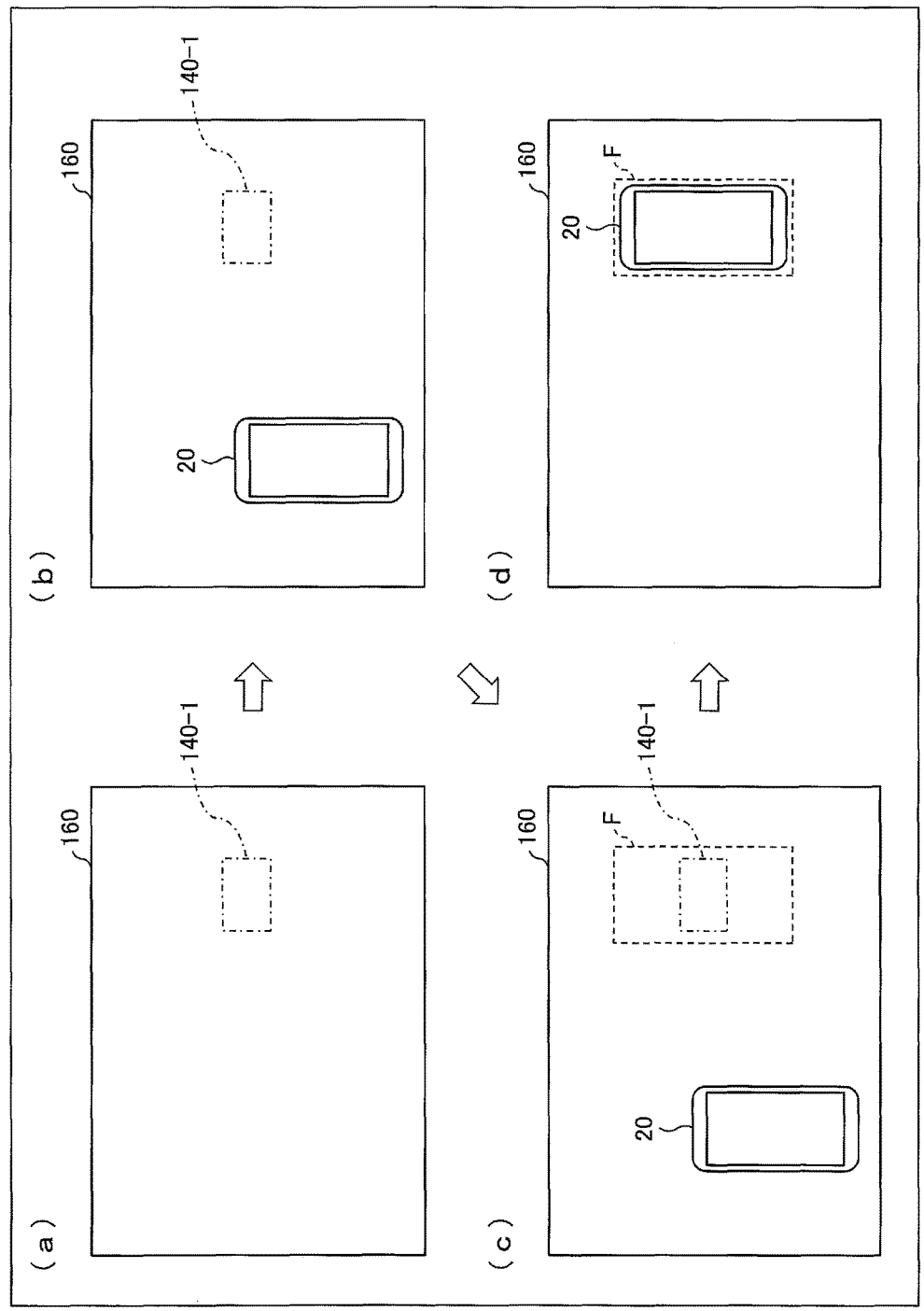
FIG. 5 is a diagram illustrating another example of display screen transitions in the display apparatus in accordance with Embodiment 1 of the present invention.

Discussed next, in more detail and with reference to FIG. 5, is an example of the guide displayed by the display apparatus 10 in a case where the display apparatus 10 has not acquired the model information of the mobile terminal 20 (in the case of "NO" in step S102 of FIG. 3). FIG. 5 is a diagram illustrating another example of display screen transitions in the display apparatus 10. Note that, to simplify the description, the example illustrated in FIG. 5 shows only the NFC antenna 140-1 of the display apparatus 10.

As illustrated by the dotted and dashed line of (a) of FIG. 5, the NFC antenna 140-1 is provided so as to positionally overlap with the display apparatus display section 160. As illustrated in (b) of FIG. 5, once the mobile terminal 20 comes into proximity to the display apparatus display section 160 (step S101 of FIG. 3), the display apparatus 10 acquires the shape information of the mobile terminal 20 (step S104 of FIG. 3). Next, as illustrated in (c) of FIG. 5, the display apparatus 10 causes the display apparatus display section 160 to display, as the guide for bringing the mobile terminal 20 into proximity to the NFC antenna 140-1, a box F having the shape indicated by the shape information acquired by the display apparatus 10 (step S105 of FIG. 3). As illustrated in (c) of FIG. 5, the display apparatus 10 sets the display position of the box F such that the box F includes the NFC antenna 140-1 in a central portion of the box F. This makes it possible, in a case where the mobile terminal 20 comes into proximity to the position indicated by the box F as illustrated in (d) of FIG. 5, to reduce the risk that the NFC antenna 240 of the mobile terminal 20 and the NFC antenna 140-1 will be significantly out of alignment. This increases the likelihood that near field communication will be established between the mobile terminal 20 and the display apparatus 10.

Figure 6:
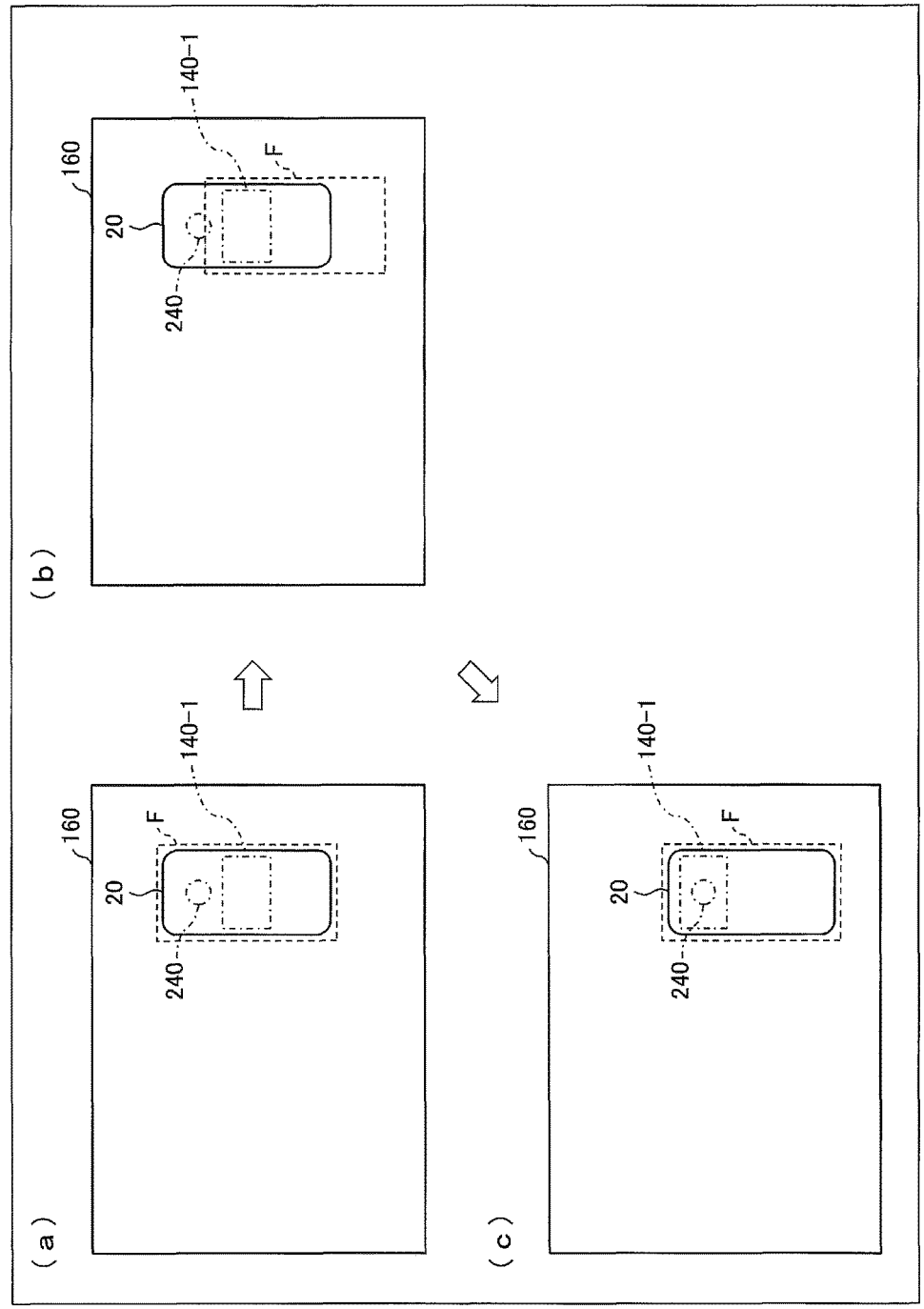
FIG. 6 is a diagram illustrating yet another example of display screen transitions in the display apparatus in accordance with Embodiment 1 of the present invention.

Described next, with reference to FIG. 6, is processing (step S108 of FIG. 3) to be carried out a case where, in the example illustrated in FIG. 5, near field communication is not established (in the case of "NO" in step S107 of FIG. 3). FIG. 6 is a diagram illustrating yet another example of display screen transitions in the display apparatus 10. Note that in the example illustrated in FIG. 6 as well, only the NFC antenna 140-1 of the display apparatus 10 is shown.

In the example illustrated in (a) of FIG. 6, the NFC antenna 240 of the mobile terminal 20 is provided in an upper-half region of the mobile terminal 20. As such, in a case where the box. F including the NFC antenna 140-1 in a central portion thereof is displayed as illustrated in FIG. 5, the NFC communication control section 133 will determine that near field communication between the mobile terminal 20 and the display apparatus 10 has not been established ("NO" in step S107 of FIG. 3). In such a case, the display apparatus 10 changes the display position of the box F in a manner so as to shift the box F. Specifically, the display apparatus 10 changes the display position of the box F (step S108 of FIG. 3) so that the box F includes the NFC antenna 140-1 in an upper-half region thereof, as illustrated in (b) of FIG. 6.

As illustrated in (c) of FIG. 6, once the display position of the box F is changed and the user brings the mobile terminal 20 into proximity to that position ("YES" in step S106 of FIG. 3), the NFC antenna 240 of the mobile terminal 20 and the NFC antenna 140-1 are in proximity to each other. As a result, the NFC communication control section 133 determines that near field communication has been established between the mobile terminal 20 and the display apparatus 10 ("YES" in step S107 of FIG. 3).

Note that the display apparatus 10 is preferably configured such that, in a case where near field communication with the mobile terminal 20 has been established, the display apparatus 10 estimates an installation position of the antenna 240 of the mobile terminal 20 by referring to (i) the display position of the box F and (ii) an installation position of the NFC antenna 140-1, and then stores the installation position of the antenna 240 thus estimated. Doing so enables the display apparatus 10 to, in subsequent processing, more reliably establish near field communication with the mobile terminal 20 by referring to a stored installation position and then displaying the box F accordingly.

In the example illustrated in FIG. 6, in a case where the NFC antenna 240 is provided in a lower-half region of the mobile terminal 20, changing the display position of the box F as illustrated in (c) of FIG. 6 will not enable near field communication to be established between the mobile terminal 20 and the display apparatus 10. In such a case, the display apparatus 10 need only be configured so as to once again change the display position of the box F, in a manner so as to shift the box F upward from the display position shown in (a) of FIG. 6.

In the example illustrated in FIG. 6, the display apparatus 10 is configured so as to shift the display position of the box F vertically with respect to the display apparatus display section 160, but the display apparatus 10 may also be configured to shift the display position horizontally. The display apparatus 10 can also be configured such that, in a case where near field communication has not been established, the display apparatus 10 repeatedly shifts the display position until near field communication is established, in accordance with a preset order of directions in which the display position is to be shifted.

Furthermore in a case where the display apparatus 10 includes an audio output section (not shown), the audio output section can output audio which indicates, to the user, a direction in which the mobile terminal 20 should be shifted.

Discussed next, with reference to FIG. 7, is an example of the guide displayed by the display apparatus 10 in a case where the display apparatus 10 has acquired the model information of the mobile terminal 20 in proximity to the display apparatus display section 160 ("YES in step S102 of FIG. 3). Note that in the example illustrated in FIG. 7 as well, only the NFC antenna 140-1 of the display apparatus 10 is shown.

(a) of FIG. 7 is a diagram illustrating a mobile terminal 20a, which is an example of the mobile terminal 20. As illustrated in (a) of FIG. 7, an NFC antenna 240a of the mobile terminal 20a is provided in an upper-half region of the mobile terminal 20a. In the model information table stored in the display apparatus storage section 120, there is a mutual association between (i) the model information and (ii) an installation position of an NFC antenna of a mobile terminal indicated by respective model information. As such, in a case where the display apparatus 10 has acquired the model information from the mobile terminal 20a, the display control section 131 can identify the installation position of the NFC antenna 240a in the mobile terminal 20a by referring to the model information table.

(b) of FIG. 7 is a diagram illustrating an example of a guide displayed in order to bring the mobile terminal 20a into proximity to the NFC antenna 140-1. As illustrated in (b) of FIG. 7, since the display apparatus 10 can identify the installation position of the NFC antenna 240a in the mobile terminal 20a, the display apparatus 10 can display the box F in a manner so as to bring the NFC antenna 240a and the NFC antenna 140-1 into proximity to each other. This makes it possible to reliably establish near field communication between the mobile terminal 20a and the display apparatus 10.

(c) of FIG. 7 is a diagram illustrating a mobile terminal 20b, which is another example of the mobile terminal 20. As illustrated in (c) of FIG. 7, an NFC antenna 240b of the mobile terminal 20b is provided in a lower-half region of the mobile terminal 20b. In a case where the display apparatus 10 has acquired the model information of the mobile terminal 20b, the display apparatus 10 displays the box F as illustrated in (d) of FIG. 7, (d) of FIG. 7 is a diagram illustrating an example of a guide displayed for bringing the mobile terminal 20b into proximity to the NFC antenna 140-1. The display apparatus 10 is able to display the box F in a manner so as to bring the NFC antenna 240b and the NFC antenna 140-1 into proximity to each other, as illustrated in (d) of FIG. 7. This makes it possible to reliably establish near field communication between the mobile terminal 20b and the display apparatus 10.

The display apparatus 10 can also be configured such that, in a case where the mobile terminal 20 provides attitude information as an output signal from the gyroscopic sensor 260, the display apparatus 10 further changes the display position of the box F in accordance with the attitude information. For example, the display apparatus 10 can be configured such that, in a case where the display apparatus 10 refers to the attitude information and determines that the user is holding the mobile terminal 20a upside-down (vertically reversed), the display apparatus 10 does not display the guide as illustrated in (b) of FIG. 7, but rather displays the guide as illustrated in (d) of FIG. 7.

In the display apparatus 10, modes of displaying the guide are not limited to the modes described above. For example, the display apparatus 10 can be configured to change the display position of the guide in accordance with the content being displayed on the display apparatus display section 160. Alternatively, the display apparatus 10 can be configured to change a mode of displaying the content in accordance with the display position of the guide being displayed on the display apparatus display section 160. For example, depending on the model of the mobile terminal 20, a portion of the content (for example, text) being displayed on the display apparatus display section 160 may overlap with a guide that has been displayed in accordance with the shape of the mobile terminal 20. The display apparatus 10 can be configured such that, in a case as above, the display apparatus 10 causes part or all of the content being displayed on the display apparatus display section 160 to move, so as to avoid overlapping with the display position of the guide.

(a) of FIG. 8 is a diagram illustrating an example of a display screen of the display apparatus 10. (b) of FIG. 8 is a diagram illustrating another example of a display screen of the display apparatus 10. In the examples shown in FIG. 8, the display apparatus 10 includes NFC antennas 140-1 through 140-15.

In a case where the mobile terminal 20 is in proximity to the display apparatus display section 160 as illustrated in (a) of FIG. 8, the display apparatus 10 preferably displays the box F in a manner so as to bring the mobile terminal 20 into proximity to the NFC antenna 140-8, which is the NFC antenna positioned nearest to the mobile terminal 20. However, depending on the content being displayed on the display apparatus display section 160, displaying the box F in the vicinity of the NFC antenna 140-8 may hinder viewing of the content. In such a case, the display apparatus 10 may, for example, change the display position of the box F by displaying the box F in a manner so as to bring the mobile terminal 20 into proximity to the NFC antenna 140-9, as illustrated in (b) of FIG. 8. In the above case, the display apparatus 10 may be configured such that, for example, the display apparatus storage section 120 stores layout information which indicates a display layout of the content to be displayed, the layout information being associated with the moving image data representing the content. The display control section 131 can then set the display position of the guide after referring to the layout information.

As described above, with the display apparatus 10 in accordance with Embodiment 1, the mobile terminal 20 coming into proximity to the display apparatus display section 160 can trigger the display apparatus 10 to display the guide. That is, there is no need for the display apparatus 10 to constantly display the guide on the display apparatus display section 160. As such, the display apparatus 10 makes it possible to facilitate the establishment of near field communication with the mobile terminal 20 while reducing hindrance of viewing of the displayed content.

Note that although Embodiment 1 discusses an example in which the touch panel 150 detects that the mobile terminal 20 has come into proximity to the display apparatus display section 160, the display apparatus 10 is not limited to such a configuration. For example, the display apparatus 10 may be configured such that the mobile terminal 20 having come into proximity to the display apparatus display section 160 is detected by any of the NFC antennas 140-1 through 140-*n* receiving a radio wave from the antenna 240 of the mobile terminal 20.

Embodiment 2

The following description will discuss Embodiment 2 of the present invention with reference to FIGS. 9 through 11. Note also that, for convenience, members having functions identical to those of the respective members of the foregoing embodiment are given respective identical reference numerals, and a description of those members is omitted.

FIG. 9 is a functional block diagram illustrating main components of a display apparatus 10*a* in accordance with Embodiment 2. The display apparatus 10*a* differs from the display apparatus 10 in that, in the former, the display apparatus control section 130 also functions as an antenna position estimating section 135 (position estimating section), as illustrated in FIG. 9.

The antenna position estimating section 135 serves to estimate a position at which the NFC antenna 240 is located in the mobile terminal 20 (this position hereinafter also referred to as "antenna position"). An example of a configuration for estimating the antenna position is described as follows. The display apparatus display section 160 can include, for example, a region in which NFC antennas 140 are provided more densely than in other regions (that is, include an area for antenna position estimation), and the display apparatus 10*a* can prompt the user to bring the mobile terminal 20 into proximity to the region. The NFC communication control section 133 supplies, to the antenna position estimating section 135, information indicating which of the NFC antennas 140 in the reason have established communication with the mobile terminal 20 (for example, an antenna ID for identifying the NFC antennas 140-1 through 140-*n*). The antenna position estimating section 135 can estimate the antenna position by referring to the information supplied by the NFC communication control section 133. The antenna position estimating section 135 then supplies, to the display control section 131, antenna position information which indicates the antenna position thus estimated.

The display control section 131 causes the display apparatus display section 160 to display the box F as a guide in a manner such that the antenna position, as estimated by the antenna position estimating section 135, is brought into proximity to one of the NFC antennas 140-1 through 140-*n*.

Discussed next, with reference to FIG. 10, is a flow of processing in the display apparatus 10*a*. FIG. 10 is a flow chart illustrating a flow of processing in the display apparatus 10*a* in accordance with Embodiment 2.

(Step S201)

The display control section 131 causes the display apparatus display section 160 to display an image or text which prompts the user of the mobile terminal 20 to bring the mobile terminal 20 into proximity to the area for antenna position estimation.

(Step S202)

Next, the touch panel 150 of the display apparatus 10*a* detects that the mobile terminal 20 has come into proximity to the area for antenna position estimation. Upon this detection, the touch panel 150 supplies, to the proximity position information acquiring section 132, proximity position information of the mobile terminal 20 which has come into proximity to the area for antenna position estimation. The proximity position information acquiring section 132 then (i) refers to the proximity position information thus acquired, (ii) acquires the shape information of the mobile terminal 20, and (iii) supplies the shape information to the display control section 131. The display control section 131 acquires the shape information from the proximity position information acquiring section 132.

(Step S203)

The NFC communication control section 133 supplies, to the antenna position estimating section 135, information indicating which of the NFC antennas 140 in the area for antenna position estimation have established communication with the mobile terminal 20. The antenna position estimating section 135 estimates the antenna position of the mobile terminal 20 by referring to the information supplied by the NFC communication control section 133. The antenna position estimating section 135 the supplies, to the display control section 131, antenna position information which indicates the antenna position thus estimated.

(Step S204)

Next, the display control, section 131 causes the display apparatus display section 160 to display the box F as a guide in a manner so that the antenna position, as estimated by the antenna position estimating section 135, is in proximity to any of the NFC antennas 140-1 through 140-*n*. Note, here, that the box F which is displayed is a box having a shape indicated by the shape information acquired in step S202.

(Step S205 Through 209)

The processing of steps S205 through S209 is identical to that of steps S106 through S110 of FIG. 3. As such, a description of such is omitted here.

(Example of Guide Displayed by Display Apparatus 10*a*)

Discussed next, with reference to FIG. 11, are examples of the guide which the display apparatus 10*a* displays. FIG. 11 is a diagram illustrating an example of display screen transitions in the display apparatus 10*a* in accordance with Embodiment 2. As illustrated in (a) of FIG. 11, in the display apparatus 10, NFC antennas 140-1 through 140-9 are provided more densely than the NFC antennas 140-10 through 140-23. In other words, the region in which the NFC antennas 140-1 through 140-9 are provided is the area for antenna position estimation.

The display apparatus 10*a* displays the box F in a manner so as to prompt the user to bring the mobile terminal 20 into proximity to the area for antenna position estimation (step S201 of FIG. 10), for example, in the manner illustrated in (a) of FIG. 11. The shape of the box F displayed here need only be a predetermined shape. Once the mobile terminal 20 has come into proximity to the position indicated by the box F of (a) of FIG. 11 (step S202 of FIG. 10), the touch panel 150 and the proximity position information acquiring section 132 acquire the shape information of the mobile terminal 20. The NFC communication control section 133 and the antenna position estimating section 135 then estimate the antenna position of the mobile terminal 20 (step S203 of FIG. 10). In a case where the mobile terminal 20 in proximity to the display apparatus display section 160 is the mobile terminal 20*a* as illustrated in (a) of FIG. 7, out of the NFC antennas 140-1 through 140-9 provided in the area for antenna position estimation, communication is established with the NFC antenna 140-2.

Next, the display apparatus 10*a* determines which of the NFC antennas 140 to bring the mobile terminal 20*a* into proximity to, so as to avoid hindering viewing of the content being displayed on the display apparatus display section 160. In a case where the display apparatus 10a has selected the NFC antenna 140-20 as the antenna which the mobile terminal 20a should be in proximity to, the display apparatus 10a causes the display apparatus display section 160 to display the box F in a manner such that the antenna position, which has been estimated, is brought into proximity to the NFC antenna 140-20, as illustrated in (b) of FIG. 11 (step S204 of FIG. 10). Bringing the mobile terminal 20a into proximity to the position indicated by the box F, as illustrated in (c) of FIG. 11, causes the NFC antenna 240 of the mobile terminal 20a to come into proximity to the NFC antenna 140-20.

In this way, the display apparatus 10a makes it possible to estimate the antenna position of the mobile terminal 20, and then display the guide in a manner such that the antenna position thus estimated is brought into proximity to the at least one NFC antenna 140. As such, the display apparatus 10a makes it possible to more reliably establish near field communication with the mobile terminal 20.

Embodiment 3

The following description will discuss Embodiment 3 of the present invention with reference to FIGS. 12 through 14. Note also that, for convenience, members having functions identical to those of the respective members of the foregoing embodiments are given respective identical reference numerals, and a description of those members is omitted.

The foregoing embodiments discussed a configuration in which the box F having the shape of the mobile terminal 20 is displayed as a guide for bringing the mobile terminal 20 into proximity to the at least one NFC antenna 140. Note, however, that modes of displaying the guide are not limited to this. Described in Embodiment 3 is an example where an arrow indicating a direction in which to move the mobile terminal 20 is displayed.

FIG. 12 is a functional block diagram illustrating main components of a display apparatus 10b in accordance with Embodiment 3. The display apparatus 10b differs from the display apparatus 10 in that, in the former, the display apparatus control section 130 also functions as an antenna distance estimating section 136 (distance estimating section), as illustrated in FIG. 12. Furthermore, in Embodiment 3, the display apparatus storage section 120 of the display apparatus 10b stores an antenna position information table, in which antenna IDs for identifying each of the NFC antennas 140-1 through 140-n are associated with coordinates indicating the respective positions at which the NFC antennas 140-1 through 140-n are provided in the display apparatus display section 160.

The antenna distance estimating section 136 serves to estimate respective distances from the mobile terminal 20 to each one of the NFC antennas 140-1 through 140-n. Specifically, once the mobile terminal 20 has come into proximity to the display apparatus display section 160, the NFC communication control section 133 supplies, to the antenna distance estimating section 136, radio wave intensity information. This information indicates respective intensities of radio waves received from the mobile terminal 20 by each of the NFC antennas 140-1 through 140-n. The antenna distance estimating section 136 estimates the respective distances from the mobile terminal 20 to each of the NFC antennas 140-1 through 140-n by referring to the radio wave intensity information supplied by the NFC communication control section 133. The antenna distance estimating section 136 supplies, to the display control section 131, distance information indicating each of the distances thus estimated.

The display control section 131 identifies which of the NFC antennas 140 is nearest to the mobile terminal 20 by referring to the distance information supplied by the antenna distance estimating section 136. The display control section 131 acquires the coordinates indicating the position of the identified one of the NFC antennas 140 by referring to the antenna position information table stored in the display apparatus storage section 120. The display control section 131 also acquires coordinates indicating the position of the mobile terminal 20 by referring to the proximity position information supplied by the proximity position information acquiring section 132. The display control section 131 causes the display apparatus display section 160 to display an arrow which points in a direction from the mobile terminal 20 toward whichever of the NFC antennas 140 is nearest to the mobile terminal 20, in accordance with the distance estimated by the antenna distance estimating section 136.

Note that in Embodiment 3, the display apparatus 10b can be configured so as not to include the touch panel 150, in such a case, detection of the proximity position of the mobile terminal 20 is achieved by a configuration in which the display control section 131 identifies coordinates indicating the position of the mobile terminal 20 with respect to the display apparatus display section 160. The display control section 131 identifies the coordinates by referring to (i) the distance information supplied by the antenna distance estimating section 136 and (ii) the antenna position information table stored in the display apparatus storage section 120.

Discussed next, with reference to FIG. 13, is a flow of processing in the display apparatus 10b. FIG. 13 is a flow chart illustrating a flow of processing in the display apparatus 10b in accordance with Embodiment 3.

(Step S301)

The touch panel 150 of the display apparatus 10b detects that the mobile terminal 20 has come into proximity to the display apparatus display section 160. Receipt of a notification of such from the proximity position information acquiring section 132 triggers the display control section 131 to commence processing for displaying the guide, as with the display apparatus 10 of Embodiment 1.

(Step S302)

Next, the antenna distance estimating section 136 estimates the respective distances from the mobile terminal 20 to each of the NFC antennas 140-1 through 140-n by referring to the radio wave intensity information supplied by the NFC communication control section 133. The antenna distance estimating section 136 supplies, to the display control section 131, the distance information indicating each of the distance thus estimated.

(Step S303)

Next, the display control section 131 causes the display apparatus display section 160 to display an arrow which points in a direction from the mobile terminal 20 toward whichever of the NFC antennas 140 is nearest to the mobile terminal 20, in accordance with the distances estimated by the antenna distance estimating section 136.

(Step S304)

As in step S106 of FIG. 3, the display apparatus 10 waits to proceed with processing until the touch panel 150 detects that the mobile terminal 20 has come into proximity to the position indicated by the guide.

(Step S305)

As in step S107 of FIG. 3, once the touch panel 150 has detected that the mobile terminal 20 has come into proximity to the position indicated by the guide, the NFC communication control section 133 determines whether or not communication has been established between the mobile terminal 20 and one of the NFC antennas 140 (more specifically, one of the NFC antennas 140-1 through 140-*n*). In a case where communication has not been established between the mobile terminal 20 and one of the NFC antennas 140, the display apparatus 10*b* returns to step S302. In a case where communication has been established between the mobile terminal 20 and one of the NFC antennas 140, the display apparatus 10 proceeds to step S306.

(Step S306 Through S307)

The processing of steps S306 and S307 is identical to that of steps S109 and S110 of FIG. 3. As such, a description of such is omitted here.

(Example of Guide Displayed by Display Apparatus 10*b*)

Discussed next, with reference to FIG. 14, is an example of the guide which the display apparatus 10*b* displays. FIG. 14 is a diagram illustrating an example of a display screen of the display apparatus 10*b* in accordance with Embodiment 3.

As illustrated in FIG. 14, the display apparatus 10*b* includes the NFC antennas 140-1 through 140-*n*. Once the touch panel 150 detects that the mobile terminal 20 has come into proximity to a position as shown in FIG. 14 (step S301 of FIG. 13), the antenna distance estimating section 136 estimates the respective distances from the mobile terminal 20 to each of the NFC antennas 140-1 through 140-*n* by referring to the radio wave intensity information supplied by the NFC communication control section 133 (step S302 of FIG. 13).

The display control section 131 identifies which of the NFC antennas 140 is nearest to the mobile terminal 20 by referring to the distance information supplied by the antenna distance estimating section 136. In the example of FIG. 14, the NFC antenna 140-8 is nearest to the mobile terminal 20. The display control section 131 acquires the coordinates indicating the position of the NFC antenna 140-8 by referring to the antenna position information table stored in the display apparatus storage section 120. The display control section 131 also acquires coordinates indicating the position of the mobile terminal 20 by referring to the proximity position information supplied by the proximity position information acquiring section 132. Then, the display control section 131 causes the display apparatus display section 160 to display an arrow A, which points in a direction from the mobile terminal 20 toward the NFC antenna 140-8, as illustrated in FIG. 14 (step S303 of FIG. 13).

In this way, the display apparatus 10*b* in accordance with Embodiment 3 enables the user to easily apprehend how the mobile terminal 20 should be brought into proximity to the display apparatus display section 160.

Embodiment 4

The following description will discuss Embodiment 4 of the present invention with reference to FIGS. 15 through 18. Note that, for convenience, members having functions identical to those of the respective members of the foregoing embodiments are given respective identical reference numerals, and a description of those members is omitted.

FIG. 15 is a diagram schematically illustrating an image display system 1 in accordance with Embodiment 4, The image display system 1 includes a display apparatus 10*c* and a server 30 (information providing server). Similarly to the respective display apparatuses of the foregoing embodiments, the display apparatus 10*c* is capable of communicating with the mobile terminal 20. As illustrated in FIG. 15, the display apparatus 10*c* of Embodiment 4 operates in conjunction with the server 30 and receives, from the server 30, display position information indicating a display position for displaying a guide. In other words, in Embodiment 4, the server 30 functions as an information providing server which provides the display position information to the display apparatus 10*c*.

FIG. 16 is a block diagram illustrating main components of the display apparatus 10*c* of Embodiment 4. As illustrated in FIG. 16, the display apparatus 10*c* differs from the display apparatus 10 in that the former includes a proximity position information acquiring section 132*c* and a communication control section 134*c*, instead of the proximity position information acquiring section 132 and the communication control section 134, respectively, of the display apparatus 10.

The proximity position information acquiring section 132*c* acquires, from the touch panel 150, proximity position information which indicates the proximity position of the mobile terminal 20 in proximity to the display apparatus display section 160. The proximity position information acquiring section 132*c* then sends, to the communication control section 134*c*, the proximity position information thus acquired. The communication control section 134*c* sends, to the server 30 and via the display apparatus communication section 110, the proximity position information received from the proximity position information acquiring section 132*c*. Receipt of the proximity position information from the display apparatus 10*c* triggers the server 30 to commence processing for causing the display apparatus 10*c* to display a guide for bringing the mobile terminal 20 into proximity to the display apparatus display section 160.

The communication control section 134*c* serves to control communication, specifically communication carried out via the display apparatus communication section 110. The communication control section 134*c* sends, to the server 30 and via the display apparatus communication section 110, model information of the mobile terminal 20, the model information being acquired from the display apparatus communication section 110.

Furthermore, in Embodiment 4, the display control section 131 receives display position information from the server 30 and via the display apparatus communication section 110. The display control section then causes the display apparatus display section 160 to display the guide at a position indicated by the display position information.

(Server 30)

(a) of FIG. 17 is a functional block diagram illustrating main components of the server 30 of Embodiment 4. As illustrated in (a) of FIG. 17, the server 30 includes a server communication section 310, a server storage section 320, and a server control section 330.

The server communication section 310 serves to send and receive various information to/from the display apparatus 10*c* via a network. The server communication section 310 receives, from the display apparatus 10*c*, the proximity position information and the model information of the mobile terminal 20. The server communication section 310 sends, to the display apparatus 10*c*, display position information which is generated by a guide display position determining section 332 (described later).

The server storage section 320 stores a control program for operating the server 30 and an application which operates on the server 30. The server storage section 320 also stores the model information table and the antenna position information table as described in the foregoing embodiments.

As illustrated in (a) of FIG. 17, the server control section 330 also functions as (i) a communication control section 331 (display position information outputting section) and (ii) a guide display position determining section 332 (display position information out putting section).

The communication control section 331 serves to control communication, specifically communication carried out via the server communication section 310. The communication control section 331 supplies, to the guide display position determining section 332, various information that the server communication section 310 has acquired from the display apparatus 10c. The communication control section 331 also supplies, to the display apparatus 10c and via the server communication section 310, the display position information generated by the guide display position determining section 332.

Receipt of the proximity position information of the mobile terminal 20 from the display apparatus 10c triggers the guide display position determining section 332 to (i) generate the display position information and (ii) provide, to the display apparatus 10c, the display position information thus generated.

In a case where the guide display position determining section 332 has not acquired, from the display apparatus 10c, the model information of the mobile terminal 20, the guide display position determining section 332 generates shape information indicating the shape of the mobile terminal 20. The guide display position determining section 332 achieves this by extracting, from the proximity position information that has been acquired, proximity positions corresponding to the four corners of the housing of the mobile terminal 20. After referring to (i) the shape information that has been generated and (ii) the antenna position information table, the guide display position determining section 332 determines the display position at which the display apparatus display section 160 will display the guide. This display position is determined in a manner so as to avoid hindering viewing of the content being displayed by the display apparatus 10c. The guide display position determining section 332 generates the display position information, which indicates the display position thus determined. The guide display position determining section 332 then provides, to the display apparatus 10c and via the server communication section 310, the display position information thus generated. In this case, the guide display position determining section 332 also provides, to the display apparatus 10c, the shape information.

In a case where the guide display position determining section 332 has acquired the model information of the mobile terminal 20 from the display apparatus 10c, the guide display position determining section 332 (i) refers to the model information table stored in the server storage section 320 and (ii) determines that the display apparatus display section 160 will display a box F in accordance with the model indicated by the model information of the mobile terminal 20. After referring to (i) the model information table and (ii) the antenna position information table, the guide display position determining section 332 also determines the display position of the box P in a manner so as to avoid hindering viewing of the content being displayed by the display apparatus 10c. The guide display position determining section 332 generates the display position information, which indicates the display position thus determined. The guide display position determining section 332 provides, to the display apparatus 10c and via the server communication section 310, the display position information thus generated.

In this way, a portion of the processing carried out by the respective display apparatuses of Embodiments 1 through 3 can be achieved in conjunction with the server 30.

(Hardware Configuration of Server 30)

(b) of FIG. 17 is a block diagram illustrating a hardware configuration of the server 30 of Embodiment 4. As illustrated in (b) of FIG. 17, the server 30 includes a communication section 3100, a storage section 3200, and a control section 3300.

The communication section 3100 is an interface for enabling communication with the display apparatus 10c via a network. The communication section 3100 realizes the functions of the server communication section 310.

The storage section 3200 includes a main storage section and an auxiliary storage section. Examples of devices which can be used as the main storage section of the storage section 3200 encompass semiconductor RAM (random access memory). Examples of the devices which can be used as the auxiliary storage section of the storage section 3200 encompass a hard disk drive (HDD). The auxiliary storage section stores a control program for operating the server 30. The control program is for realizing the functions of the server control section 330.

The control section 3300 realizes the functions of the server control section 330 by (i) loading the control program on the main storage section of the storage section 3200 and (ii) executing various instructions contained in the control program thus loaded. Examples of devices which can be used as the control section 3300 encompass a CPU (Central Processing Unit).

(Flow of Processing in Image Display System 1)

Discussed next, with reference to FIG. 18, is a flow of processing in the image display system 1 in accordance with Embodiment 4. FIG. 18 is a sequence diagram illustrating a flow of processing in the image display system 1 in accordance with Embodiment 4.

(Step S401)

The touch panel 150 of the display apparatus 10c detects that the mobile terminal 20 has come into proximity to the display apparatus display section 160.

(Step S402)

Next, the proximity position information acquiring section 132c acquires, from the touch panel 150, proximity position information which indicates the proximity position of the mobile terminal 20 in proximity to the display apparatus display section 160. The proximity position information acquiring section 132c then sends, to the communication control section 134c, the proximity position information thus acquired. The communication control section 134c sends, to the server 30 and via the display apparatus communication section 110, the proximity position information received from the proximity position information acquiring section 132c. In a case where the display apparatus 10c has acquired the model information of the mobile terminal 20, the communication control section 134c sends, to the server 30, the model information along with the proximity position information.

(Step S403)

Receipt of the proximity position information from the display apparatus 10c triggers the server 30 to commence processing for causing the display apparatus 10c to display a guide for bringing the mobile terminal 20 into proximity to the display apparatus display section 160. The guide display position determining section 332 of the server 30 determines the display position of the guide via the above-described processing, and then generates the display position information.

(Step S404)

The communication control section 331 of the server 30 provides, to the display apparatus 10c and via the server communication section 310, the display position information generated in step S403.

(Step S405)

After referring to the display position information received from the server 30, the display control section 131 of the display apparatus 10c controls the display apparatus display section 160 such that the display apparatus display section 160 displays the guide at the position indicated by the display position information.

(Step S406)

Once the guide is displayed in step S405, the display apparatus 10c waits to proceed with processing until the touch panel 150 detects that the mobile terminal 20 has come into proximity to the position indicated by the guide.

(Step S407)

Once the touch panel 150 has detected that the mobile terminal 20 has come into proximity to the position indicated by the guide, the NFC communication control section 133 determines whether or not communication has been established between the mobile terminal 20 and one of the NFC antennas 140 (more specifically, one of the NFC antennas 140-1 through 140-n). In a case where communication has not been established between the mobile terminal 20 and one of the NFC antennas 140, the display apparatus 10c proceeds to step S408. In a case where communication between the mobile terminal 20 and one of the NFC antennas 140 has been established, the display apparatus 10c proceeds to step S411.

(Step S408)

In a case where near field communication between the mobile terminal 20 and one of the NFC antennas 140 has not been established in step S407, the display apparatus 10c provides notification of such to the server 30.

(Step S409)

Upon receiving, in step S408, the notification from the display apparatus 10c that near field communication has not been established, the guide display position determining section 332 of the server 30 changes the display position of the guide. The processing for changing the display position can be carried out in a manner similar to that of the display control section 131 of Embodiment 1, as described with reference to FIG. 6. The guide display position determining section 332 newly creates display position information indicating the display position thus changed.

(Step S410)

Next, the server 30 provides, to the display apparatus 10c, the display position information generated in step S409. Upon receiving the display position information, the display apparatus 10c returns to step S405.

(Step S411)

In a case where communication between the mobile terminal 20 and one of the NFC antennas 140 has been established in step S407, the NFC communication control section 133 acquires, from the mobile terminal 20 and via the one of the NFC antennas 140, the user information of the mobile terminal 20. The NFC communication control section 133 supplies, to the display control section 131, the user information thus acquired.

(Step S412)

Next, the display control section 131 refers to the user information supplied by the NFC communication control section 133 and causes the display apparatus display section 160 to display content, selected from the content stored in the display apparatus storage section 120, which content is suited to the user indicated by the user information.

In this way, the image display system 1 makes it possible to cause the display apparatus 10c to display the guide indicating which position the user should bring the mobile terminal 20 in proximity to, while concurrently reducing hindrance of viewing of the displayed content. As such, the image display system 1 makes it possible to facilitate the establishment of near field communication between the mobile terminal 20 and the display apparatus 10c.

Embodiment 5

The following description will discuss Embodiment 5 of the present invention with reference to FIGS. 19 through 20. Note that, for convenience, members having functions identical to those of the respective members of the foregoing embodiments are given respective identical reference numerals, and a description of those members is omitted.

In Embodiment 4, the display apparatus 10c was configured to receive, from the server 30, the display position information indicating the display position of the guide, in Embodiment 5, the display apparatus 10c is configured to receive, from a server 30a, content to be displayed on the display apparatus display section 160. In other words, in Embodiment 5, the server 30a functions as a content providing server which provides, to the display apparatus 10c, content to be displayed. Furthermore, the display apparatus 10c of Embodiment 5 is configured to receive, from the server 30a, an image including the guide used to bring the mobile terminal 20 into proximity to the display apparatus display section 160.

FIG. 19 is a functional block diagram illustrating main components of the server 30a included in an image display system 1 in accordance with Embodiment 5. As illustrated in FIG. 19, the server 30a differs from the server 30 in that the former includes a display image generating section 333 instead of the guide display position determining section 332.

In Embodiment 5, the server storage section 320 also stores moving image data, which represents content to be displayed on the display apparatus display section 160. The server storage section 320 can also store image data representing the guide used for bringing the mobile terminal 20 into proximity to one of the NFC antennas 140. In such a case, the image data and the model information are preferably associated with each other in the model information table stored in the server storage section 320.

The display image generating section 333 serves to generate image data which is supplied to the display apparatus 10c. The display image generating section 333 provides, to the display apparatus 10c and via the server communication section 310, the moving image data stored in the server storage section 320. The display control section 131 of the display apparatus 10c causes the display apparatus display section 160 to display content which is represented by the moving image data supplied by the server 30a.

The display image generating section 333 also refers to the proximity position information and the model information received from the display apparatus 10c, and thereafter determines the display position of the guide used for bringing the mobile terminal 20 into proximity to the display apparatus display section 160. Processing for determining the display position of the guide can be carried out in a manner similar to that of the guide display position determining section 332 of Embodiment 4. The display image generating section 333 generates overlaid image data, in which the guide is overlaid, at the display position that has been determined, onto the content, to be supplied to the display apparatus 10c. The display image generating section 333 then provides, to the display apparatus 10c and via the server communication section 310, the overlaid image data thus generated.

In this way, even in a configuration where the server 30a supplies images to be displayed on the display apparatus 10c, the guide can be displayed in the same manner as the respective display apparatuses of Embodiment 1 through 3.

(Flow of Processing in Image Display System 1)

Discussed next, with reference to FIG. 20, is a flow of processing the image display system 1 in accordance with Embodiment 5. FIG. 20 is a sequence diagram illustrating a flow of processing in the image display system 1 in accordance with Embodiment 5.

(Step S501 Through 502)

The processing of steps S501 and S502 is identical to that of steps S401 and S402 of FIG. 18. As such, a description of such is omitted here.

(Step S503)

Receipt of the proximity position information from the display apparatus 10c triggers the server 30a commence processing for generating the overlaid image data, in which the guide is overlaid on the content to be displayed. The display image generating section 333 of the server 30a generates the overlaid image data via the above-described processing.

(Step S504)

The communication control section 331 of the server 30a provides, to the display apparatus 10c and via the server communication section 310, the overlaid image data generated in step S503.

(Step S505)

The display control section 131 of the display apparatus 10c controls the display apparatus display section 160 such that the display apparatus display section 160 displays an image represented by the overlaid image data supplied by the server 30a in step S504.

(Step S506 Through 508)

The processing of steps S506 through S508 is identical to that of steps S406 through S408 of FIG. 18. As such, a description of such is omitted here.

(Step S509)

Upon receiving, in step S508, the notification from the display apparatus 10c that near field communication has not been established, the display image generating section 333 of the server 30a newly generates overlaid image data in which the display position of the guide has been changed. The processing for changing the display position can be carried out in a manner similar to that of the display control section 131 of Embodiment 1, as described with reference to FIG. 6.

(Step S510)

Next, the server 30a provides, to the display apparatus 10c and via the server communication section 310, the overlaid image data generated in step S509. Upon receiving the overlaid image data, the display apparatus 10c returns to step S505.

(Step S511 Through S512)

The processing of steps S511 and S512 is identical to that of steps S411 and S412 of FIG. 18. As such, a description of such is omitted here.

In this way, even in a configuration where the server 30a supplies images to be displayed on the display apparatus 10c, the guide can be displayed in the same manner as the respective display apparatuses of Embodiment 1 through 3.

Embodiment 6

Embodiments 4 and 5 discussed examples where a single server 30 and a single server 30a, respectively, were employed. In Embodiment 6, individual servers can be used to achieve the functions of both the server 30 and the server 30a. In a case where a plurality of servers are used, each server can be managed by the same operator or by respective different operators.

Embodiment 7

Control blocks of each of the display apparatus 10 and the display apparatuses 10a through 10c (in particular, the display control section 131, the antenna position estimating section 135, and the antenna distance estimating section 136) can be realized by a logic circuit (hardware) provided in an integrated circuit (IC chip) or the like or can be alternatively realized by software as executed by a central processing unit (CPU).

Control blocks of each of the mobile terminal 20, the mobile terminal 20a, and the mobile terminal 20b (in particular, the mobile terminal control section 230) can also be realized by a logic circuit (hardware) provided in an integrated circuit (IC chip) or the like or can be alternatively realized by software as executed by a central processing unit (CPU).

Control blocks of each of the server 30 and the server 30a (in particular, the guide display position determining section 332 and the display image generating section 333) can also be realized by a logic circuit (hardware) provided in an integrated circuit (IC chip) or the like or can be alternatively realized by software as executed by a central processing unit (CPU).

In a case where the respective control block are realized by software as executed by a CPU, the display apparatus 10, the display apparatuses 10a through 10c, the server 30, and the server 30a each includes a CPU that executes instructions of a program that is software realizing the foregoing functions; a read only memory (ROM) or a storage device (each referred to as "storage medium") in which the program and various kinds of data are stored so as to be readable by a computer (or a CPU); and a random access memory (RAM) in which the program is loaded. An object of the present invention can be achieved by a computer (or a CPU) reading and executing the program, stored in the storage medium. Examples of the storage medium encompass "a non-transitory tangible medium" such as a tape, a disk, a card, a semiconductor memory, and a programmable logic circuit. The program can be supplied to the computer via any transmission medium (such as a communication network or a broadcast wave) which allows the program to be transmitted. Note that the present invention can also be achieved in the form of a computer data signal in which the program is embodied via electronic transmission and which is embedded in a carrier wave.

[Recapitulation]

A display apparatus (display apparatus 10, 10a, 10b, 10c) in accordance with Aspect 1 of the present invention is a display apparatus capable of communicating with a mobile terminal (mobile terminal 20), including: at least one antenna (NFC antenna 140) for carrying out near field communication with the mobile terminal, the at least one antenna being provided so as to positionally overlap with a display section (display apparatus display section 160) of the display apparatus; and a display control section (display control section 131) configured to output an image and cause the display section to display the image, the display control section causing, in a case where the mobile terminal has come into proximity to the display section, the display section to display a guide for bringing the mobile terminal into proximity to at least one of the at least one antenna.

With the above configuration, there is no need for the display apparatus to include a driving means for moving the at least one antenna to a position at which the mobile terminal has been brought into proximity with the display apparatus. As such, the above configuration makes it possible to facilitate the establishment of near field communication with a mobile terminal while also preventing malfunctions and an increase in the burden of maintenance.

Furthermore, the above configuration makes it possible for the display apparatus to cause the display section to display the guide, upon being triggered by the mobile terminal coming into proximity to the display section. That is, there is no need for the display apparatus to constantly display the guide on the display section. As such, the above configuration makes it possible to reduce the degree to which the guide hinders viewing of displayed content.

In Aspect 2 of the present invention, the display apparatus of Aspect 1 is preferably configured to further include an information acquiring section (display apparatus communication section 110, proximity position information acquiring section 132, communication control section 134, and touch panel 150) configured to acquire at least one of (i) shape information which indicates a shape of the mobile terminal which is in proximity to the display section and (ii) model information of the mobile terminal which is in proximity to the display section, the guide being displayed, by the display section, as a box (box F) whose shape corresponds to at least one of the shape information and the model information acquired by the information acquiring section.

With the above configuration, the display apparatus displays, as the guide, a box whose shape corresponds to at least one of the shape information and the model information. As such, the above configuration makes it possible for the user to easily apprehend how the mobile terminal should be brought into proximity to the display section. This makes it possible to correctly bring the mobile terminal into proximity to the display section.

In Aspect 3 of the present invention, the display apparatus of Aspect 1 or 2 is preferably configured such that in a case where (i) the mobile terminal is in proximity to a position indicated by the guide and (ii) communication is not established between the mobile terminal and at least one of the at least one antenna, the display control section changes a display position of the guide to a position which at least partially overlaps with a current display position.

With the above configuration, the display apparatus changes the display position of the guide to a position that at least partially overlaps with the current display position. That is, the display apparatus changes the display position of the guide so as to shift the guide from its current display position. As such, the display apparatus makes it possible to change the display position of the guide in a case where, even though the mobile terminal is in proximity to the guide, communication has not been established between the mobile terminal and one of the at least one antennas. This makes it possible to prompt the user to change the position at which the mobile terminal is placed in proximity to the display apparatus. The above configuration therefore makes it possible to reliably establish near field communication between the mobile terminal and the display apparatus. Note that the display apparatus may be configured so that the display position of the guide is shifted vertically with respect to the display section. The display apparatus may also be configured so that the display position of the guide is shifted horizontally.

In Aspect 4 of the present invention, the display apparatus of any one of Aspects 1 through 3 is preferably configured so as to further include a position estimating section (antenna position estimating section 135) configured to estimate a position at which an antenna of the mobile terminal is located in the mobile terminal, the display control section causing the display section to display the guide in a manner such that the position estimated by the position estimating section is brought into proximity to a position of one of the at least one antenna.

The position of an NFC antenna in a mobile terminal is likely to differ depending on the model of the mobile terminal. As such, communication with the mobile terminal may not be established even if the mobile terminal has been brought into proximity to the position indicated by the guide. With the above configuration, the display apparatus can estimate the position at which the antenna of the mobile terminal is located in the mobile terminal. This makes it possible to more reliably establish near field communication between the mobile terminal and the display apparatus.

Note that examples of a configuration for estimating the position encompass a configuration in which the display apparatus includes a region in which a plurality of the at least one antenna are provided more densely than in other regions. In such a configuration, the position of the antenna of the mobile terminal can be estimated by determining which of the plurality of the at least one antenna the mobile terminal establishes communication with when the mobile terminal is in proximity to the region.

In Aspect 5 of the present invention, the display apparatus of Aspect 1 is preferably configured to further include a distance estimating section (antenna distance estimating section 136) configured to estimate respective distances from the mobile terminal to each of the at least one antenna, the display control section causing the display section to display, as the guide, an arrow (arrow A) pointing in a direction from the mobile terminal toward whichever antenna of the at least one antenna is nearest to the mobile terminal, in accordance with the respective distances estimated by the distance estimating section.

With the above configuration, the display apparatus can estimate the respective distances from (i) the mobile terminal in proximity to the display section to (ii) each of the at least one antenna. The display apparatus can then display, as the guide, an arrow pointing in a direction from the mobile terminal toward whichever antenna of the at least one antenna is nearest to the mobile terminal, in accordance with the respective distances estimated by the distance estimating section. This enables the user to easily apprehend how the mobile terminal should be brought into proximity to the display section.

In Aspect 6 of the present invention, the display apparatus of any one of Aspects 1 through 5 is preferably configured such that the display control section changes the display position of the guide in accordance with content being displayed on the display section.

The above configuration makes it possible to further reduce hindering viewing of displayed content.

An image display system (image display system 1) in accordance with Aspect 7 of the present invention is an image display system including: a display apparatus (display apparatus 10c) which includes at least one antenna (NFC antenna 140) for carrying out near field communication with a mobile terminal (mobile terminal 20), the at least one antenna being provided so as to positionally overlap with a display section of the display apparatus; and a server (server 30) which includes a display position information outputting section (communication control section 331, guide display position determining section 332), the display position information outputting section being configured to provide, to the display apparatus, display position information which indicates a display position of a guide, the guide being for bringing the mobile terminal into proximity to at least one of the at least one antenna.

With the above configuration, there is no need for the display apparatus to include a driving means for moving the at least one antenna to a position at which the mobile terminal has been brought into proximity with the display apparatus. As such, the above configuration makes it possible to facilitate the establishment of near field communication with a mobile terminal while also preventing malfunctions and an increase in the burden of maintenance.

Furthermore, with the above configuration, in a case where the display position information has been provided by the server, the display apparatus can display the guide after referring to the display position information. That is, there is no need for the display apparatus to constantly display the guide on the display section. As such, the above configuration makes it possible to reduce the degree to which the guide hinders viewing of displayed content.

An information providing server (server 30) in accordance with Aspect 8 of the present invention is an information providing server, which connects to a display apparatus (display apparatus 10c) capable of communicating with a mobile terminal (mobile terminal 20), the information providing server including: a display position information outputting section (communication control section 331, guide display position determining section 332) configured to provide, to the display apparatus, display position information which indicates a display position of a guide, the guide being for bringing the mobile terminal into proximity to at least one antenna (NFC antenna 140) of the display apparatus, the at least one antenna, being (i) for carrying out near field communication with the mobile terminal and (ii) provided so as to positionally overlap with a display section of the display apparatus.

With the above configuration, there is no need for the display apparatus to include a driving means for moving the at least one antenna to a position at which the mobile terminal has been brought into proximity with the display apparatus. As such, the above configuration makes it possible to facilitate the establishment of near field communication with a mobile terminal while also preventing malfunctions and an increase in the burden of maintenance.

Furthermore, with the above configuration, in a case where the display position information has been provided by the server, the display apparatus can display the guide after referring to the display position information. That is, there is no need for the display apparatus to constantly display the guide on the display section. As such, the above configuration makes it possible to reduce the degree to which the guide hinders viewing of displayed content.

An information providing method in accordance with Aspect 9 of the present invention is an information providing method for providing information to a display apparatus (display apparatus 10c) capable of communicating with a mobile terminal (mobile terminal 20), the method including the step of: providing, to the display apparatus, display position information which indicates a display position of a guide, the guide being for bringing the mobile terminal into proximity to at least one antenna (NFC antenna 140) of the display apparatus, the at least one antenna being (i) for carrying out near field communication with the mobile terminal and (ii) provided so as to positionally overlap with a display section of the display apparatus.

The above configuration brings about advantageous effects similar to those of the above-described server.

The display apparatuses and the information providing servers in accordance with each aspect of the present invention may be realized by a computer. In such a case, the scope of the present invention encompasses: a control program for the display apparatuses and the information providing servers, which program causes a computer to operate as each section of the display apparatuses and the information providing servers (limited to software-implententable sections) so that the display apparatuses and the information providing servers can be realized by the computer; and a computer-read able storage medium in which the expansion control program is stored.

[Additional Remarks]

The present invention is not limited to the embodiments, but can be altered by a skilled person in the art within the scope of the claims. An embodiment derived from a proper combination of technical means each disclosed in a different embodiment is also encompassed in the technical scope of the present invention. Further, it is possible to form a new technical feature by combining the technical means disclosed in the respective embodiments.

INDUSTRIAL APPLICABILITY

An aspect of the present invention can be applied to, for example, a display apparatus capable of carrying out near field communication with a mobile terminal.

REFERENCE SIGNS LIST

1 Image display system
10, 10a, 10b, 10c Display apparatus
110 Display apparatus communication section (information acquiring section)
131 Display control section
132, 132c Proximity position information acquiring section (information acquiring section)
134, 134c Communication control section (information acquiring section)
135 Antenna position estimating section (position estimating section)
136 Antenna distance estimating section (distance estimating section)
140 NFC antenna (antenna)
150 Touch panel (information acquiring section)
160 Display apparatus display section (display section)
20 Mobile terminal
30, 30a Server (information providing server)
331 Communication control section (display position information output ting section)
332 Guide display position determining section (display position information outputting section)

The invention claimed is:
1. A display apparatus capable of communicating with a mobile terminal, comprising:
at least one antenna for carrying out near field communication with the mobile terminal, the at least one antenna being provided so as to positionally overlap with a display section of the display apparatus;

a display control section configured to output an image and cause the display section to display the image; and an information acquiring section configured to acquire an attitude information indicating an attitude of the mobile terminal, in a case where the mobile terminal has come into proximity to the display section, the display control section causing, by referring to the attitude information, the display section to display a guide for bringing the mobile terminal into proximity to at least one of the at least one antenna, the display control section changes the display position of the guide in accordance with content being displayed on the display section, and the display control section causing the display section to display the guide at a position such that the guide is not overlapped with a text of the content being displayed on the display section.

2. The display apparatus as set forth in claim 1, further comprising an information acquiring section configured to acquire at least one of (i) shape information which indicates a shape of the mobile terminal which is in proximity to the display section and (ii) model information of the mobile terminal which is in proximity to the display section, the guide being displayed by the display section, as a box whose shape corresponds to at least one of the shape information and the model information acquired by the information acquiring section.

3. The display apparatus as set forth in claim 1, wherein in a case where (i) the mobile terminal is in proximity to a position indicated by the guide and (ii) communication is not established between the mobile terminal and at least one of the at least one antenna, the display control section changes a display position of the guide to a position which at least partially overlaps with a current display position.

4. The display apparatus as set forth in claim 1, further comprising a position estimating section configured to estimate a position at which an antenna of the mobile terminal is located in the mobile terminal, the display control section causing the display section to display the guide in a manner such that the position estimated by the position estimating section is brought into proximity to a position of one of the at least one antenna.

5. The display apparatus as set forth in claim 1, further comprising a distance estimating section configured to estimate respective distances from the mobile terminal to each of the at least one antenna, the display control section causing the display section to display, as the guide, an arrow pointing in a direction from the mobile terminal toward whichever antenna of the at least one antenna is nearest to the mobile terminal, in accordance with the respective distances estimated by the distance estimating section.

* * * * *